US008824391B2

(12) United States Patent
Yang et al.

(10) Patent No.: US 8,824,391 B2
(45) Date of Patent: Sep. 2, 2014

(54) METHOD FOR TRANSMITTING SOUNDING REFERENCE SIGNAL IN WIRELESS COMMUNICATION SYSTEM AND APPARATUS THEREFOR

(75) Inventors: Suck Chel Yang, Anyang-si (KR); Dong Youn Seo, Anyang-si (KR); Jung Hoon Lee, Anyang-si (KR); Joon Kui Ahn, Anyang-si (KR); Hak Seong Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 366 days.

(21) Appl. No.: 13/147,811

(22) PCT Filed: Dec. 2, 2009

(86) PCT No.: PCT/KR2009/007147
§ 371 (c)(1),
(2), (4) Date: Aug. 4, 2011

(87) PCT Pub. No.: WO2010/110526
PCT Pub. Date: Sep. 30, 2010

(65) Prior Publication Data
US 2011/0306335 A1 Dec. 15, 2011

Related U.S. Application Data

(60) Provisional application No. 61/163,437, filed on Mar. 25, 2009, provisional application No. 61/165,480, filed on Mar. 31, 2009.

(30) Foreign Application Priority Data

Nov. 10, 2009 (KR) ........................ 10-2009-0108023

(51) Int. Cl.
*H04W 4/00* (2009.01)
*H04L 5/00* (2006.01)
*H04L 25/02* (2006.01)

(52) U.S. Cl.
CPC .......... *H04L 25/0226* (2013.01); *H04L 5/0092* (2013.01); *H04L 5/0051* (2013.01); *H04L 5/0007* (2013.01); *H04L 5/0064* (2013.01)
USPC ........................................................ 370/329

(58) Field of Classification Search
CPC . H04L 25/0226; H04L 5/0007; H04L 5/0051; H04L 5/0092
USPC ........................................................ 370/329
See application file for complete search history.

(56) References Cited

U.S. PATENT DOCUMENTS

| 7,970,344 | B2 | 6/2011 | Horiuchi et al. |
| 8,055,301 | B2* | 11/2011 | Teo et al. ................... 455/562.1 |
| 8,520,492 | B2* | 8/2013 | Li et al. ......................... 370/203 |
| 2005/0202818 | A1 | 9/2005 | Hondo et al. |
| 2010/0234037 | A1* | 9/2010 | Terry et al. .................... 455/450 |
| 2010/0246561 | A1* | 9/2010 | Shin et al. ...................... 370/345 |
| 2011/0176480 | A1* | 7/2011 | Dahlman et al. .............. 370/328 |

FOREIGN PATENT DOCUMENTS

| CN | 1671071 A | 9/2005 |
| CN | 101091333 A | 12/2007 |
| JP | 2009-60596 A | 3/2009 |
| WO | WO 2008/120925 A1 | 10/2008 |
| WO | WO 2008/133449 A1 | 11/2008 |
| WO | 2009/019062 A2 | 2/2009 |

OTHER PUBLICATIONS

3rd General Partnership Project, Technical Specification Group Radio Access Network, Evolved Universal Terretrial Radio Access (E-UTRA), Physical Channels and Modulation, Release 8, 3GPP TS 36.211, V8.6.0, Mar. 2009, pp. 1-83.
3rd Generation Partnership Project Technical Specification Group Radio Access Network, Evolved Universal Terretrial Radio Access (E-UTRA), Physical Layer Procedures, Release 8, 3GPP TS 36.2132 V8.6.0, Mar. 2009, pp. 1-77.
Samsung, "SRS Transmission Issues for LTE-A," 3GPP TSG RAN WG1 #55bis, R1-090100, Jan. 14-18, 2009, Ljubljana, Slovenia, 3 pages.
"Assignment Scheme of Sounding Reference Signals in E-UTRA Uplink," 3GPP TSG RAN WG1 Meeting #48, R1-070854, St. Louis, Missouri, Feb. 12-16, 2007, 3 pages.

"Sounding Reference Signal Assignments in E-UTRA Uplink," 3GPP TSG RAN WG1#48, R1-070725, Saint Louis, Missouri, USA, Feb. 12-16, 2007, 6 pages.

* cited by examiner

*Primary Examiner* — Asad Nawaz
*Assistant Examiner* — Saad A Waqas
(74) *Attorney, Agent, or Firm* — Birch, Stewart, Kolasch & Birch, LLP

(57) ABSTRACT

A method of transmitting a sounding reference signal from a user equipment to a base station in a wireless communication system using a plurality of component carriers is disclosed. The present invention includes the steps of checking offset values of a plurality of the component carriers corresponding to a subframe having the sounding reference signal applied thereto from the base station and if the sounding reference signal is transmitted using a certain component carrier of a plurality of the component carriers, transmitting the sounding reference signal to the base station using the certain component carrier in a sub-frame corresponding to the offset value of the certain component carrier. Preferably, the present invention further includes the step of if the sounding reference signals are transmitted using at least two component carriers in the same subframe, transmitting the sounding reference signal having a longest transmission periodicity among the sounding reference signals only.

6 Claims, 24 Drawing Sheets

FIG. 2
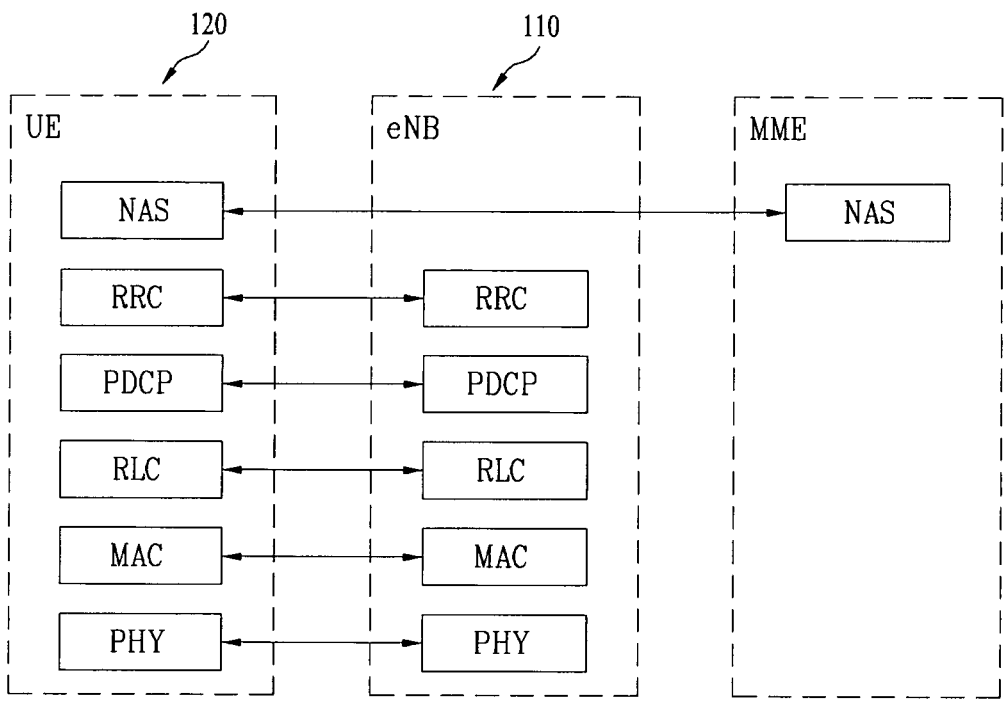
(a) Control-plane protocol stack
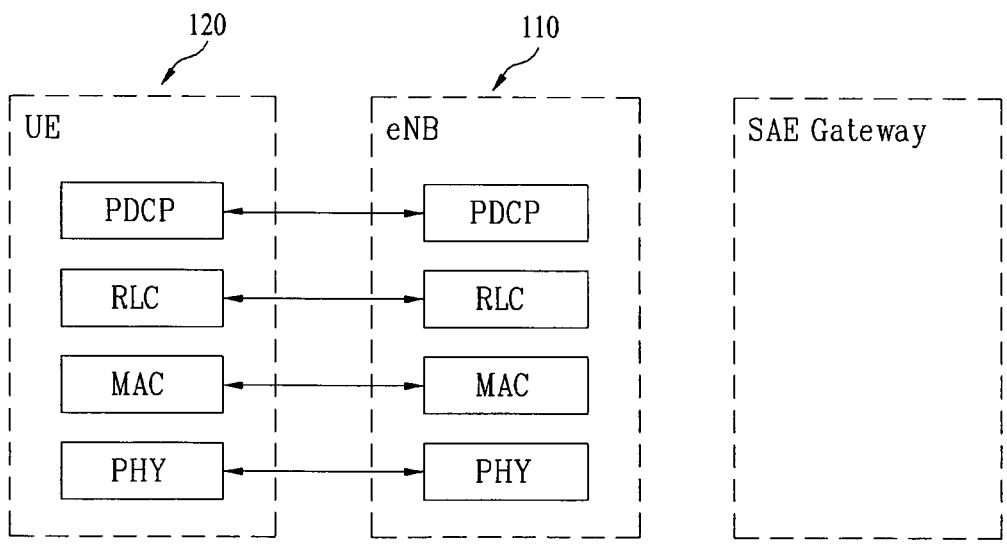
(b) User-plane protocol stack

METHOD FOR TRANSMITTING SOUNDING REFERENCE SIGNAL IN WIRELESS COMMUNICATION SYSTEM AND APPARATUS THEREFOR

CROSS REFERENCE TO RELATED APPLICATIONS:

This application is the National Phase of PCT/KR2009/007147 filed on Dec. 2, 2009, which claims priority under 35 U.S.C. 119(e) to U.S. Provisional Application No. 61/163,437 filed on Mar. 25, 2009 and to U.S. Provisional Application No. 61/165,480 filed on Mar. 31, 2009 and under 35 U.S.C. 119(a) to Patent Application No. 10-2009-0108023 filed in the Republic of Korea on Nov. 10, 2009, all of which are hereby expressly incorporated by reference into the present application.

TECHNICAL FIELD

The present invention relates to a wireless communication system, and more particularly, to a method for transmitting a sounding reference signal from a user equipment to a base station in a wireless communication system using a plurality of frequency blocks and apparatus therefor.

BACKGROUND ART

First of all, in the following description, 3GPP LTE (3$^{rd}$ generation partnership projecting long term evolution, hereinafter abbreviated LTE) is schematically explained as an example of a mobile communication system to which the present invention is applicable.

FIG. 1 is a schematic diagram of E-UMTS network structure as an example of a mobile communication system. E-UMTS (evolved universal mobile telecommunications system) is the system evolved from a conventional UMTS (universal mobile telecommunications system) and its basic standardization is ongoing by 3GPP. Generally, E-UMTS can be called LTE (long term evolution) system. For the details of the technical specifications of UMTS and E-UMTS, Release 7 and Release 8 of '3$^{rd}$ Generation Partnership Project: Technical Specification Group Radio Access Network' can be referred to.

Referring to FIG. 1, E-UMTS consists of a user equipment (UE), base stations (eNode B: eNB) 110a and 110b and an access gateway (AG) provided o an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for user or control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

Recently, standardization of next technology for LTE is ongoing by 3GPP. In this specification of the present invention, the next technology shall be named 'LTE-Advanced' or 'LTE-A'. One major difference between the LTE system and the LTE-A system is a system bandwidth difference. The LTE-A system has a target to support a broadband of maximum 100 MHz. For this, the LTE-A system uses carrier aggregation or bandwidth aggregation to achieving a broadband using a plurality of frequency blocks. The carrier aggregation enables a plurality of frequency blocks to be used as one large logic frequency band to use a wider frequency band. A bandwidth of each frequency block can be defined based on a system block used by the LTE system. Each frequency block is transmitted using a component carrier. In this specification, a component carrier can mean a frequency block for the carrier aggregation or a center carrier of a frequency block according to a context and can use the center carrier together with the frequency block.

DISCLOSURE

Technical Problem

An object of the present invention is to provide a method for transmitting sounding reference signal in wireless communication system and a apparatus therefore.

It is to be understood that technical problems to be solved by the present invention are not limited to the aforementioned technical problems and other technical problems which are not mentioned will be apparent from the following description to the person with an ordinary skill in the art to which the present invention pertains.

Technical Solution

Accordingly, the present invention is directed to a method for transmitting a sounding reference signal from a user equipment to a base station in a wireless communication system having carrier using a plurality of frequency blocks and apparatus therefor that substantially obviate one or more of the problems due to limitations and disadvantages of the related art.

An object of the present invention is to provide a method for transmitting a sounding reference signal from a user equipment to a base station in a wireless communication system having carrier aggregation applied thereto and apparatus therefore, Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of transmitting a sounding reference signal, which is transmitted to a base station by a user equipment using a plurality of component carriers in a wireless communication system, includes the steps of checking offset values of a plurality of the component carriers corresponding to a subframe having the sounding reference signal applied thereto from the base station and if the sounding reference signal is transmitted using a certain component carrier of a plurality of the component carriers, transmitting the sounding reference signal to the base station using the certain component carrier in a subframe corresponding to the offset value of the certain component carrier.

Preferably, the method further includes the step of if the sounding reference signals are transmitted using at least two component carriers in the same subframe, transmitting the sounding reference signal having a longest transmission periodicity among the sounding reference signals only.

Preferably, the method further includes the steps of if the sounding reference signals are transmitted using at least two component carriers in the same subframe, transmitting the sounding reference signal having a widest bandwidth of the component carrier among the sounding reference signals only.

Preferably, the offset values are set to different values for a plurality of the component carriers, respectively.

More preferably, the sounding reference signal is set to a value having a transmission periodicity different for each of a plurality of the component carriers.

More preferably, the sounding reference signal is set to a value having a bandwidth different for each of a plurality of the component carriers.

To further achieve these and other advantages and in accordance with the purpose of the present invention, a user equipment in a wireless communication system includes a receiving module receiving a sounding reference signal transmitting parameter from a base station, a processor respectively checking offset values of a plurality of the component carriers corresponding to a subframe having a sounding reference signal applied thereto from the sounding reference signal transmitting parameter, and a transmitting module, if the sounding reference signal is transmitted using a certain component carrier of a plurality of the component carriers, transmitting the sounding reference signal to the base station using the certain component carrier in a subframe corresponding to the offset value of the certain component carrier.

Preferably, if the sounding reference signals are transmitted using at least two component carriers in the same subframe, the transmitting module transmits the sounding reference signal having a longest transmission periodicity among the sounding reference signals only.

Preferably, if the sounding reference signals are transmitted using at least two component carriers in the same subframe, the transmitting module transmits the sounding reference signal having a widest bandwidth of the component carrier among the sounding reference signals only.

Preferably, the offset values are set to different values for a plurality of the component carriers, respectively.

More preferably, the sounding reference signal is set to a value having a transmission periodicity different for each of a plurality of the component carriers.

More preferably, the sounding reference signal is set to a value having a bandwidth different for each of a plurality of the component carriers.

It is to be understood that both the foregoing general description and the following detailed description are exemplary and explanatory and are intended to provide further explanation of the invention as claimed.

Advantageous Effects

Accordingly, the present invention provides the following effects or advantages.

First of all, a terminal is able to effectively transmit a sounding reference signal in a carrier aggregation applied wireless communication system.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2 is a diagram of structures of control and user planes of a radio interface protocol between a user equipment and E-UTRAN based on 3GPP radio access network specification;

MODE FOR INVENTION

Figure 1:
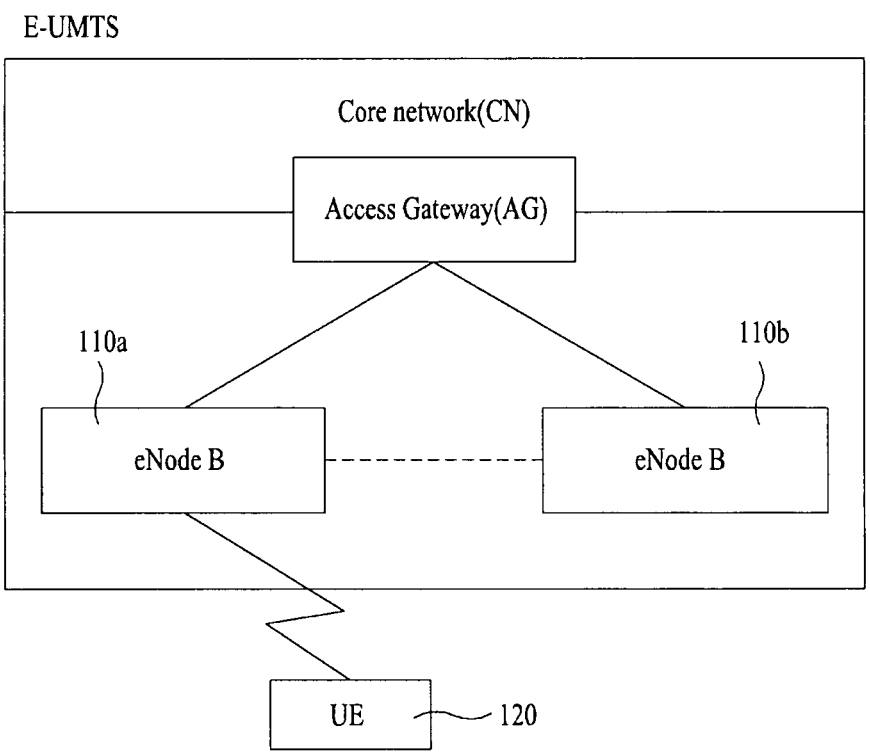
FIG. 1 is a schematic diagram of E-UMTS network structure as an example of a mobile communication system.

Reference will now be made in detail to the preferred embodiments of the present invention, examples of which are illustrated in the accompanying drawings. The embodiments described in the following description include the examples showing that the technical features of the present invention are applied to 3GPP system.

In the following description, a system, of which system band uses a single frequency block, is named a legacy system or a narrowband system. On the contrary, a system, of which system band includes a plurality of frequency blocks and uses at least one frequency block as a system block of a legacy system, is named an evolved system or a wideband system. A frequency block used as a legacy system block has the same size of a system block of a legacy system. Yet, sizes of the rest of the frequency blocks are specifically non-limited. For system simplification, it is able to determine the sizes of the rest of the frequency blocks based on the system block size of the legacy system as well. For instance, 3GPP LTE (Release-8) system ad 3GPP LTE-A (Release-9) system are related to a legacy system and an evolved system, respectively.

Based on the above definitions, the 3GPP LTE (Release-8) system is named an LTE system or a legacy system in the present specification. And, a user equipment supporting the LTE system is named an LTE user equipment or a legacy user equipment. On the contrary, the 3GPP LTE-A (Release-9) system is named an LTE-A system or an evolved system. Moreover, a user equipment supporting the LTE-A system is named an LTE-A user equipment or an evolved user equipment.

For clarity and convenience, although an embodiment of the present invention is exemplarily described in the present specification using the LTE system and the LTE-A system, the embodiment of the present invention is also applicable to any kinds of communication systems corresponding to the above definitions. Although an embodiment of the present invention is exemplarily described with reference to FDD scheme in the present specification, the embodiment of the present invention is easily modified and applicable to H-FDD or TDD scheme.

FIG. 2 is a diagram of structures of control and user planes of a radio interface protocol between a user equipment and E-UTRAN based on 3GPP radio access network specification. First of all, a control plane means a passage for transmitting control messages used by a user equipment and a network to mange a call. A user plane means a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer o the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. For this, the RRC layer of the user equipment exchanges RRC messages with the RRC layer of the network. If the RRC layers of the user equipment and network are RRC-connected to each other, the user equipment enters an RRC connected mode. Otherwise, the user equipment enters an RRC idle mode. An NAS (non-access stratum) layer above the RRC layer performs functions of session management, mobility management and the like.

One cell constructing a base station (eNB) is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via downlink SCH or a separate downlink multicast channel (MCH). Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 3:
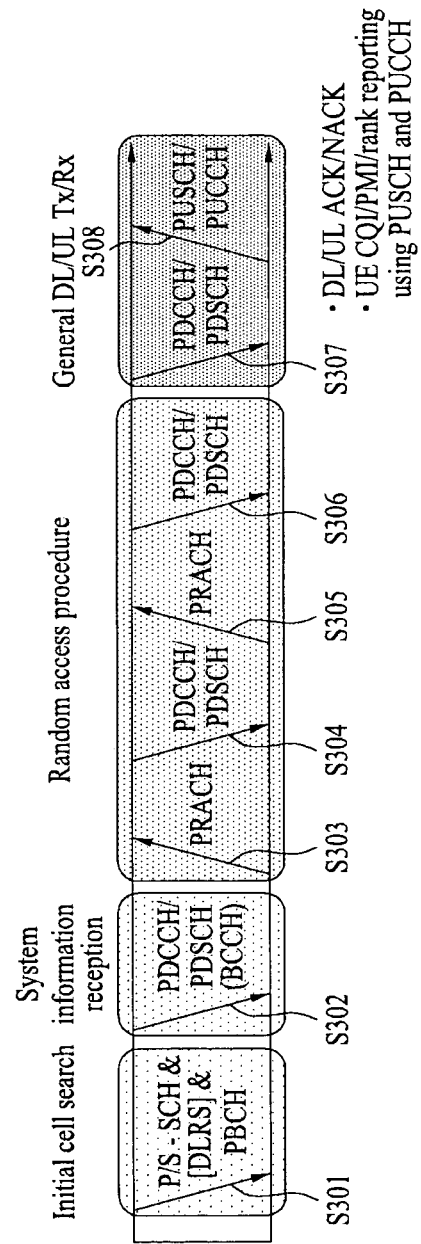
FIG. 3 is a diagram for explaining physical channels used for 3GPP system and a general method of transmitting a signal using the same.

FIG. 3 is a diagram for explaining physical channels used for 3GPP system and a general method of transmitting a signal using the same.

Referring to FIG. 3, if a power is turned on or a user equipment enters a new cell, the user equipment performs an initial cell search for matching synchronization with a base station and the like [S301]. For this, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S302].

Meanwhile, if the user equipment initially accesses the base station or fails to have a radio resource for signal transmission, the user equipment is able to perform a random access procedure (RACH) on the base station [S303 to S306]. For this, the user equipment transmits a specific sequence as a preamble via a physical random access channel (PRACH) [S303 and S305] and is then able to receive a response message via PDCCH and a corresponding PDSCH in response to the preamble [S304 and S306]. In case of contention based RACH, it is able to perform a contention resolution procedure in addition.

Having performed the above mentioned procedures, the user equipment is able to perform PDCCH/PDSCH reception [S307] and PUSCH/PUCCH (physical uplink shared channel/physical uplink control channel) transmission [S308] as a general uplink/downlink signal transmission procedure. Control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

Figure 4:
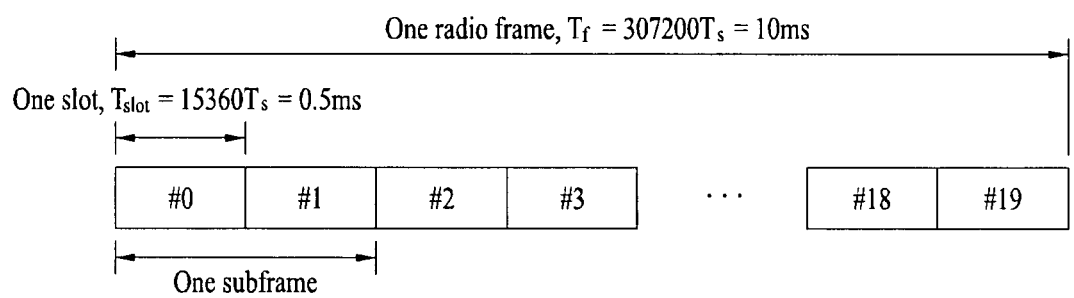
FIG. 4 is a diagram for an example of a structure of a radio frame used for LTE system.

FIG. 4 is a diagram for an example of a structure of a radio frame used for LTE system.

Referring to FIG. 4, a radio frame has a length of 10 ms (327200·$T_s$) and is constructed with 10 subframes in equal size. Each of the subframes has a length of 1 ms and is constructed with two slots. Each of the slots has a length of 0.5 ms (15360·$T_s$). In this case, $T_s$ indicates a sampling time and is expressed as $T_s=1/(15\ \text{kHz}\times 2048)=3.2552\times 10^{-8}$ (about 33 ns). The slot includes a plurality of OFDM symbols in a time domain and includes a plurality of resource blocks (RB) in a frequency domain. In the LTE system, one resource block includes '12 subcarriers×7 or 6 OFDM symbols'. A transmission time interval (TTI), which is a unit time for transmitting data, can be determined by at least one subframe unit. The above described structure of the radio frame is just exemplary. And, the number of subframes included in a radio frame, the number of slots included in a subframe and/or the number of OFDM symbols included in a slot can be modified in various ways.

Figure 5:
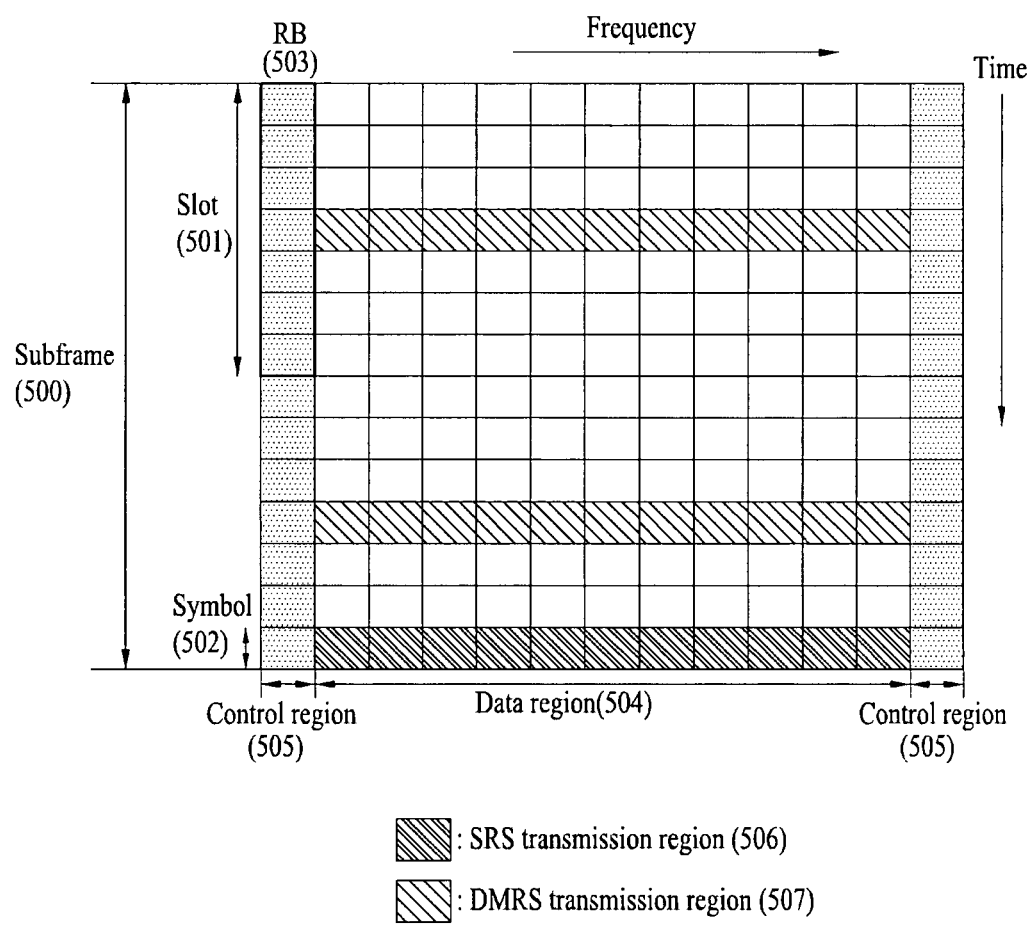
FIG. 5 is a diagram for a structure of an uplink subframe used for LTE system.

FIG. 5 is a diagram for a structure of an uplink subframe used for LTE system.

Referring to FIG. 5, a subframe 500 having 1 ms length, which is a basic unit of LTE uplink transmission, includes two 0.5 ms slots 501. In case of assuming a length of a normal cyclic prefix (CP), each slot includes 7 symbols 502. And, each of the symbols corresponds to one SC-FDMA symbol. A resource block (RB) 503 is a resource allocation unit corresponding to 12 subcarriers in a frequency domain or one slot in a time domain. A structure of an uplink subframe of LTE is mainly divided into a data region 504 and a control region 505. In this case, the data region means a series of communication resources used in transmitting such data sent to each user equipment as voice, packet and the like and corresponds to the rest of resources except the control region within a subframe. The control region means a series of communication resources used in transmitting downlink channel quality report from each user equipment, reception ACK/NACK for a downlink signal, uplink scheduling request and the like.

A time for enabling a sounding reference signal to be transmitted within one subframe, as shown in the example of FIG. 5, is an interval, in which an SC-FDMA symbol located last on a time axis within one subframe exists, and is transmitted via a data transfer band on a frequency band. Sounding reference signals of several user equipments, which are carried on a last SC-FDMA of the same subframe can be identified according to frequency positions.

A sounding reference signal includes a CAZAC constant amplitude zero auto correlation) sequence. And, sounding reference signals transmitted from a plurality of user equipments are the CAZAC sequence ($r^{SRS}(n)=r_{u,v}^{(\alpha)}(n)$) having different cyclic shift values ($\alpha$).

$$\alpha = 2\pi \frac{n_{SRS}^{cs}}{8} \quad [\text{Equation 1}]$$

In Equation 1, $n_{SRS}^{cs}$ is a value set for each user equipment by an upper layer and has an integer value ranging from 0 to 7.

CAZAC sequences are generated from one CAZAC sequence through cyclic shift. And, each of the generated CAZAC sequences is characterized in having zero correlation value with sequences having different cyclic shift values from that of the corresponding CAZAC sequence. Using this characteristic, sounding reference signals in the same frequency domain can be identified according to the CAZAC sequence cyclic shift values, respectively. A sounding reference signal of each user equipment is allocated on a frequency according to a parameter set by a base station. A user equipment performs a frequency hopping of a sounding reference signal to enable the sounding reference signal to be transmitted on a whole uplink data transmission bandwidth.

In the following description, a method of mapping a physical resource to transmit a sounding reference signal in an LTE system is explained in detail.

First of all, a sounding reference signal $r^{SRS}(n)$ is multiplied by an amplitude scaling factor $\beta_{SRS}$ to meet priority transmission power $P_{SRS}$ and is then mapped by a resource element (RE) having an index (k,l) from $r^{SRS}(0)$ by Equation 2.

$$a_{2k+k_0,l} = \begin{cases} \beta_{SRS} r^{SRS}(k) & k=0,1,\ldots,M_{sc,b}^{RS}-1 \\ 0 & \text{otherwise} \end{cases} \quad [\text{Equation 2}]$$

In Equation 2, $k_0$ indicates a frequency domain start point of a sounding reference signal and $M_{sc,b}^{RS}$ indicates a length of a sounding reference signal sequence represented by a subcarrier unit defined as Equation 3 (i.e., a bandwidth).

$$M_{sc,b}^{RS} = m_{SRS,b} N_{sc}^{RB}/2 \quad \text{[Equation 3]}$$

In Equation 3, $m_{SRS,b}$ is a value signaled from a base station according to an uplink bandwidth $N_{RB}^{UL}$ shown in Tables 1 to 4.

In order to obtain $m^{SRS,b}$, a cell specific parameter $C_{SRS}$ amounting to an integer value ranging from 0 to 7 and a user equipment specific parameter $B_{SRS}$ amounting to an integer value ranging from 0 to 3 are necessary. Values of $C_{SRS}$ and $B_{SRS}$ are given by an upper layer.

TABLE 1

$b_{hop} = 0, 1, 2, 3$, values for the uplink bandwidth of $6 \leq N_{RB}^{UL} \leq 40$.

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,b}$ | $N_b$ | $m_{SRS,b}$ | $N_b$ | $m_{SRS,b}$ | $N_b$ | $m_{SRS,b}$ | $N_b$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

TABLE 2

$b_{hop} = 0, 1, 2, 3$, values for the uplink bandwidth of $40 < N_{RB}^{UL} \leq 60$.

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

TABLE 3

$b_{hop} = 0, 1, 2, 3$, values for the uplink bandwidth of $60 < N_{RB}^{UL} \leq 80$.

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

TABLE 4

$b_{hop} = 0, 1, 2, 3$, values for the uplink bandwidth of $80 < N_{RB}^{UL} \leq 110$.

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

As mentioned in the foregoing description, to enable a sounding reference signal to be transmitted on a whole uplink data bandwidth, a user equipment is able to perform a frequency hopping of the sounding reference signal. And, this frequency hopping is set by a parameter $b_{hop}$ having a value ranging from 0 to 3 given by an upper layer.

If the frequency hopping of the sounding reference signal is not activated, i.e., $b_{hop} \geq B_{SRS}$, a frequency position index $n_b$ has a constant value, as shown in Equation 4. In this case, $n_{RRC}$ is a parameter given by an upper layer.

$$n_b = \lfloor 4 n_{RRC}/m_{SRS,b} \rfloor \bmod N_b \quad \text{[Equation 4]}$$

On the contrary, if the frequency hopping of the sounding reference signal is activated, i.e., $b_{hop} < B_{SRS}$, a frequency position index $n_b$ is defined by Equation 5 and Equation 6.

$$n_b = \begin{cases} \lfloor 4 n_{RRC}/m_{SRS,b} \rfloor \bmod N_b & b \leq b_{hop} \\ \{F_b(n_{SRS}) + \lfloor 4 n_{RRC}/m_{SRS,b} \rfloor\} \bmod N_b & \text{otherwise} \end{cases} \quad \text{[Equation 5]}$$

$$F_b(n_{SRS}) = \quad \text{[Equation 6]}$$

$$\begin{cases} (N_b/2) \left\lfloor \frac{n_{SRS} \bmod \prod_{b'=b_{hop}}^{b} N_{b'}}{\prod_{b'=b_{hop}}^{b-1} N_{b'}} \right\rfloor + \left\lfloor \frac{n_{SRS} \bmod \prod_{b'=b_{hop}}^{b} N_{b'}}{2 \prod_{b'=b_{hop}}^{b-1} N_{b'}} \right\rfloor \\ \text{if } N_b \text{ even} \\ \lfloor N_b/2 \rfloor \left\lfloor n_{SRS} / \prod_{b'=b_{hop}}^{b-1} N_{b'} \right\rfloor \\ \text{if } N_b \text{ odd} \end{cases}$$

In this case, $n_{SRS}$ is a parameter for calculating a count of transmitting a sounding reference signal and depends on Equation 7.

$$n_{SRS} = \quad \text{[Equation 7]}$$

$$\begin{cases} 2 N_{SP} n_f + 2(N_{SP} - 1) \left\lfloor \frac{n_s}{10} \right\rfloor + \left\lfloor \frac{T_{offset}}{T_{offset\_max}} \right\rfloor, \\ \text{for 2ms } SRS \text{ periodicity of } TDD \text{ frame structure} \\ \lfloor (n_f \times 10 + \lfloor n_s/2 \rfloor)/T_{SRS} \rfloor, \\ \text{otherwise} \end{cases}$$

In Equation 7, $T_{SRS}$ is a periodicity of a sounding reference signal and $T_{offset}$ indicates a subframe offset of a sounding reference signal. Moreover, $n_s$ indicates a slot number and $n_f$ indicates a frame number.

A user equipment specific sounding signal reference signal setting index $I_{SRS}$ for setting a periodicity $T_{SRS}$ of a sounding reference signal and a subframe offset $T_{offset}$ is represented as Table 5 and Table 6 according to FDD and TDD, respectively.

TABLE 5

UE Specific SRS Periodicity $T_{SRS}$ and Subframe Offset Configuration $T_{offset}$, FDD.

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$ - 2 |
| 7-16 | 10 | $I_{SRS}$ - 7 |
| 17-36 | 20 | $I_{SRS}$ - 17 |
| 37-76 | 40 | $I_{SRS}$ - 37 |
| 77-156 | 80 | $I_{SRS}$ - 77 |
| 157-316 | 160 | $I_{SRS}$ - 157 |
| 317-636 | 320 | $I_{SRS}$ - 317 |
| 637-1023 | reserved | reserved |

TABLE 6

UE Specific SRS Periodicity $T_{SRS}$ and Subframe Offset Configuration $T_{offset}$, TDD.

| Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$ - 10 |
| 15-24 | 10 | $I_{SRS}$ - 15 |
| 25-44 | 20 | $I_{SRS}$ - 25 |
| 45-84 | 40 | $I_{SRS}$ - 45 |
| 85-164 | 80 | $I_{SRS}$ - 85 |
| 165-324 | 160 | $I_{SRS}$ - 165 |
| 325-644 | 320 | $I_{SRS}$ - 325 |
| 645-1023 | reserved | reserved |

Figure 6:
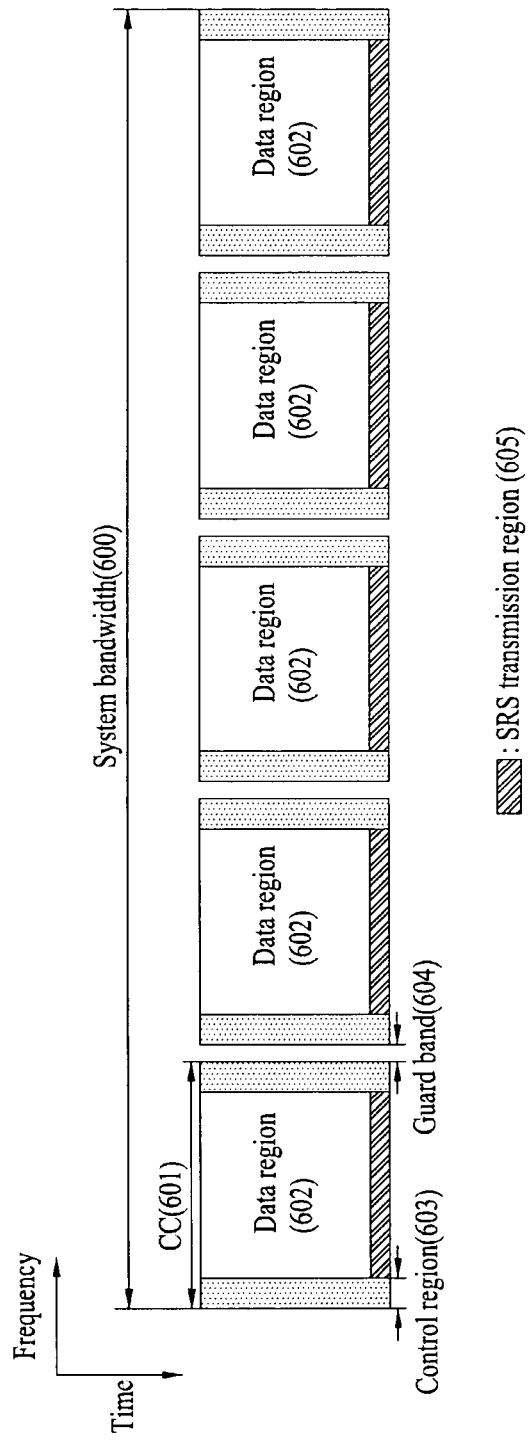
FIG. 6 is a diagram for an example of uplink transmission in LTE-A system.

FIG. 6 is a diagram for an example of transmission of an uplink system in LTE-A system.

Referring to FIG. 6, an uplink system band 600 is divided into a plurality of component carriers 601 (e.g., 5 component carriers) having a maximum 20 MHz bandwidth and each of the component carriers 601 includes a data region 602 and a control region 603 like the former LTE uplink subframe structure shown in FIG. 5. In particular, in order to enable an LTE-A system to accommodate a conventional LTE system user, an uplink transmission structure of each of the component carriers 601 to have the same structure in LTE.

For reference, in the example shown in FIG. 6, the control region 603 is provided to both ends of each of the component carriers 601 to be completely identical to the structure shown in FIG. 5. Alternatively, it is able to set the control region 603 at both ends of the whole system band 600. Moreover, in order to reduce the interference between the component carriers 601, a guard band 604 is provided. A sounding reference signal transmission region 605, which enables a transmission of a sounding reference signal in uplink of the LTE-A system, uses a last symbol interval within a subframe on a time axis and the data region 602 on a frequency axis like the structure shown in FIG. 5 to maintain compatibility with the LTE system.

Figure 7:
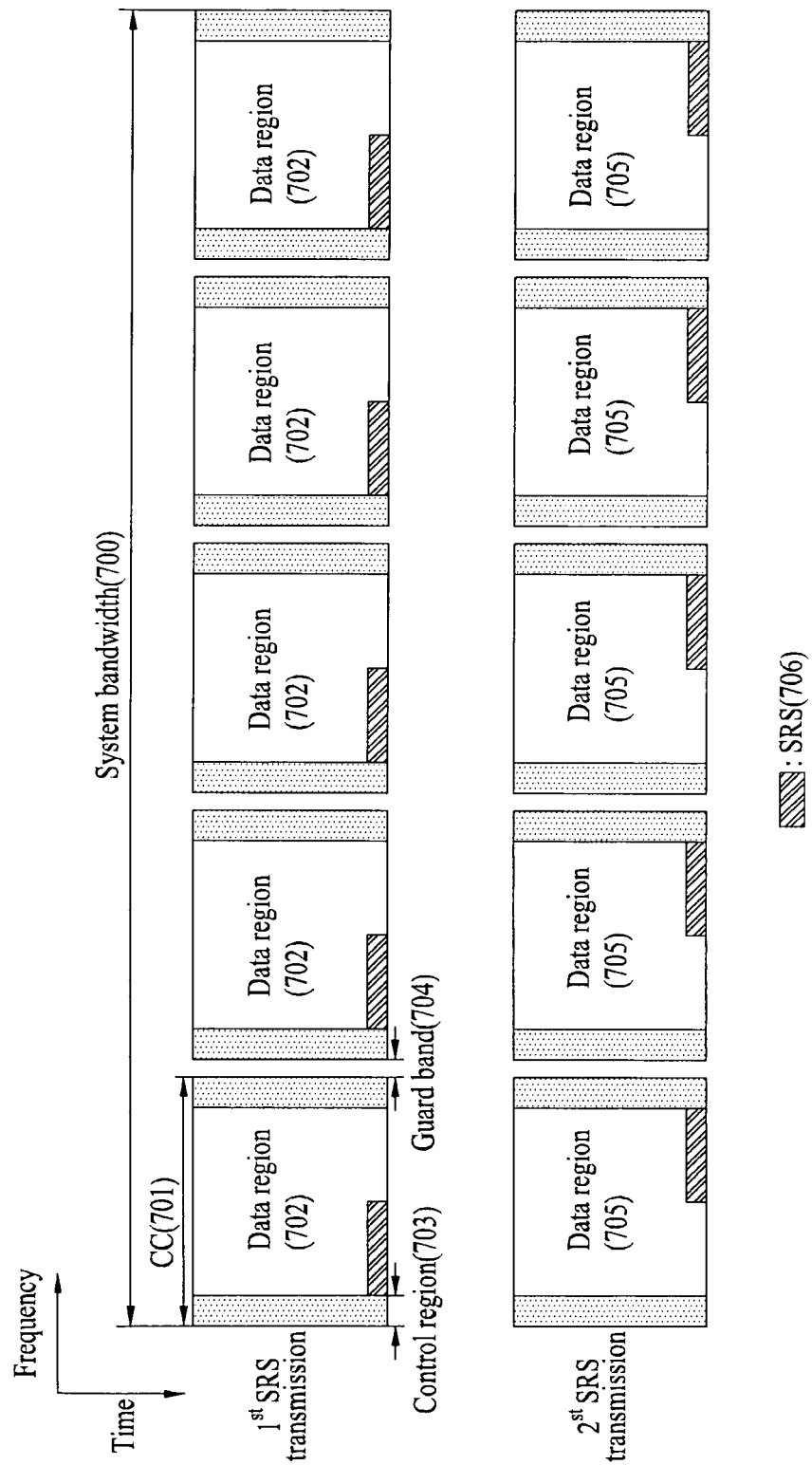
FIG. 7 is a diagram for an example for a user to send a sounding reference signal using a plurality of component carriers.

FIG. 7 is a diagram for an example for an LTE-A user to send a sounding reference signal using a plurality of component carriers.

Referring to FIG. 7, assume that an uplink system band 700 and a band of a component carrier 701 are set to 100 MHz and 20 MHz, respectively. For example shown in FIG. 7, an LTE-A user equipment performs frequency hopping every a sounding reference signal transmission timing point ($1^{st}$ SRS transmission and $2^{nd}$ SRS transmission in FIG. 7) and transmits a sounding reference signal 706 at a last symbol of a data region 702 within each component carrier 701.

Thus, if the LTE-A user equipment transmits the sounding reference signal 706, it has not been determined for a base station to signal specific information. In case that the sounding reference signal 706 is transmitted by the conventional LTE scheme for each component carrier 706, the corresponding LTE-A user equipment transmits the sounding reference signal by a multi-carrier scheme. This causes a disadvantage in that PAPR (peak to average power ratio) or CM (cubic metric) is raised.

If sounding reference signals are transmitted for all component carriers 701, a power density of the sounding reference signal received by a base station from an LTE-A user equipment located at a periphery of a cell on frequency becomes lowered considerably, whereby reliability of uplink channel status information obtained by the base station from the corresponding sounding reference signal is lowered as well. This causes a problem that the base station is unable to smoothly perform an uplink control.

In order to solve this problem, according to the present invention, a base station sets and signals a periodicity of a sounding reference signal, a bandwidth of the sounding reference signal and a subframe offset for a sounding reference signal transmission timing point between component carriers and then signals to enable a user equipment to avoid transmitting sounding reference signals simultaneously using a plurality of component carriers. For clarity and convenience of the following description, two component carriers are shown in the following embodiments. And, assume that a bandwidth of each component carrier is set to a value ranging from 40 RB to 60 RB.

First Embodiment

According to a first embodiment, every component carrier has the same bandwidth and periodicity of a sounding reference signal and a subframe offset is set for each component carrier.

Consequently, a bandwidth and periodicity of a sounding reference signal is applied to every component carrier in common but a subframe offset is individually applied to each component subcarrier. In this case, since a bandwidth of a sounding reference signal corresponding to each component carrier is identical as well as $N_c$ component carriers have the same bandwidth, time-frequency density of the sounding reference signal is constant across a whole uplink band.

Meanwhile, if no limitation is put on a transmission power of a user equipment, the same offset value can be reasonably set for each component carrier. Yet, if limitation is put on a transmission power of a user equipment, different offset values are preferably set for the component carriers, respectively to meet the single carrier property in uplink.

Figure 8:
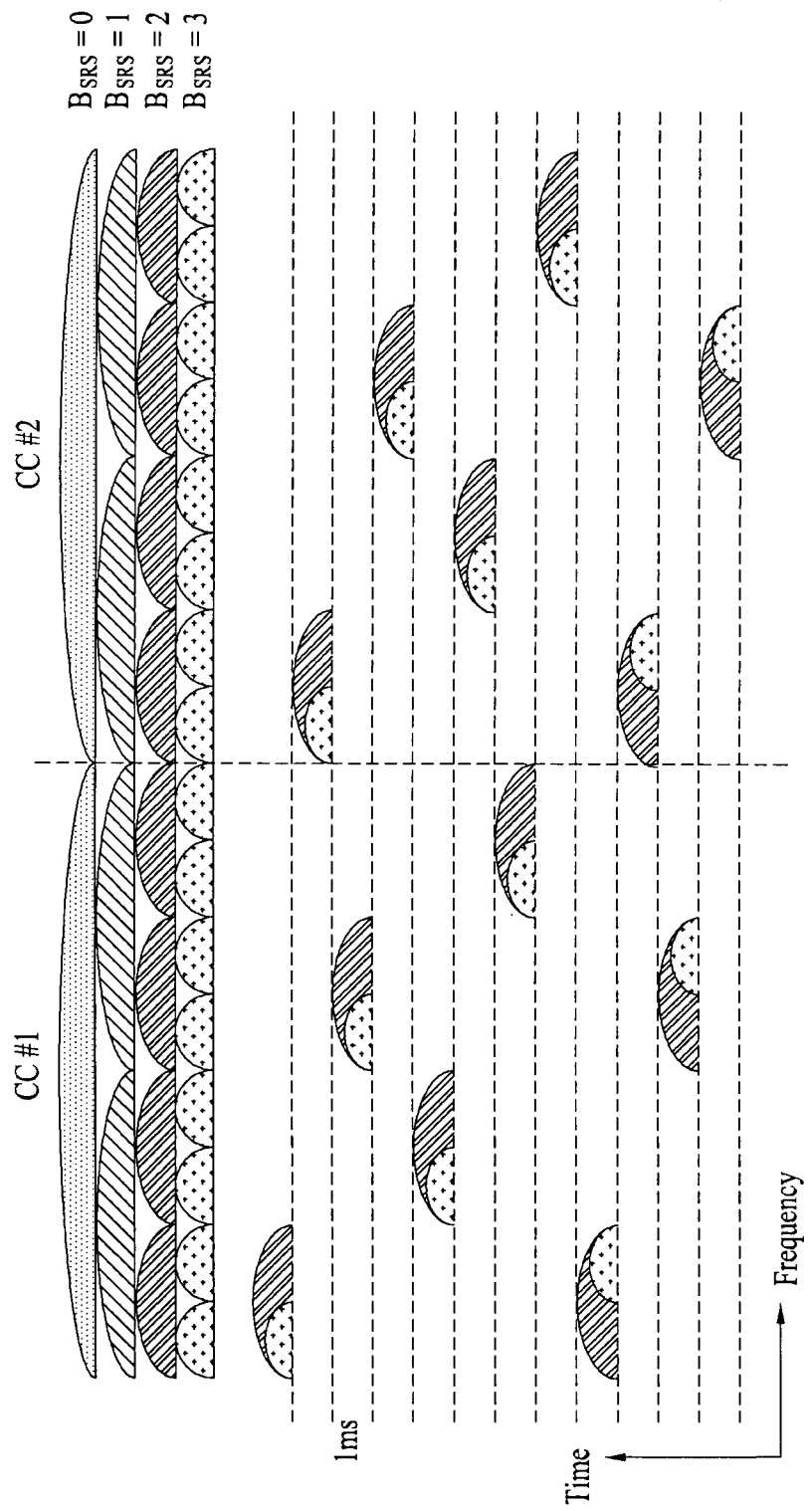
FIG. 8 is a diagram for an example of a method of mapping a sounding reference signal according to a first embodiment of the present invention if a bandwidth of each component carrier is uniform.

FIG. 8 is a diagram for an example of a method of mapping a sounding reference signal according to a first embodiment of the present invention if a bandwidth of each component carrier is identical.

First of all, according to a first embodiment of the present invention, if a bandwidth of each component carrier is identical, a base station sets one parameter combination ($C_{SRS}$, $B_{SRS}$) for setting a bandwidth of a sounding reference signal and one sounding reference signal periodicity $T_{SRS}$ and also sets $N_c$ subframe offsets for $N_c$ component carriers, respectively.

Referring to FIG. 8, a base station signals ($C_{SRS}$=4, $B_{SRS}$=2) as a sounding reference signal bandwidth parameter combination applied in common to each component carrier to a user equipment and also signals $T_{SRS}$=2 ms as a periodicity of a sounding reference signal to the user equipment. The base station signals $T_{offset}$=0 ms as a subframe offset for a first component carrier and signals $T_{offset}$=1 ms as a subframe offset for a second component carrier separately.

Hence, the user equipment transmits a sounding reference signal of 2 ms periodicity to the base station using the first component carrier and sets a bandwidth $m_{SRS,2}$ of the sounding reference signal to a value of 8 corresponding to ($C_{SRS}$=4, $B_{SRS}$=2) in Table 2. In this case, the sounding reference signal performs frequency hopping within the first component carrier by Equations 5 to 7 using $N_2$=2. Therefore, the sounding reference signal provides information on a channel status to the base station across a whole band of the first component carrier.

Likewise, the user equipment transmits a sounding reference signal of 2 ms periodicity to the base station using the second component carrier and sets a bandwidth $m_{SRS,2}$ of the sounding reference signal to a value of 8 corresponding to ($C_{SRS}$=4, $B_{SRS}$=2) in Table 2. In this case, the sounding reference signal performs frequency hopping within the first component carrier by Equations 5 to 7 using $N_2$=2. Yet, the sounding reference signal, which uses the second component carrier, starts from a subframe delayed by 1 ms allocated to an offset value.

Figure 9:
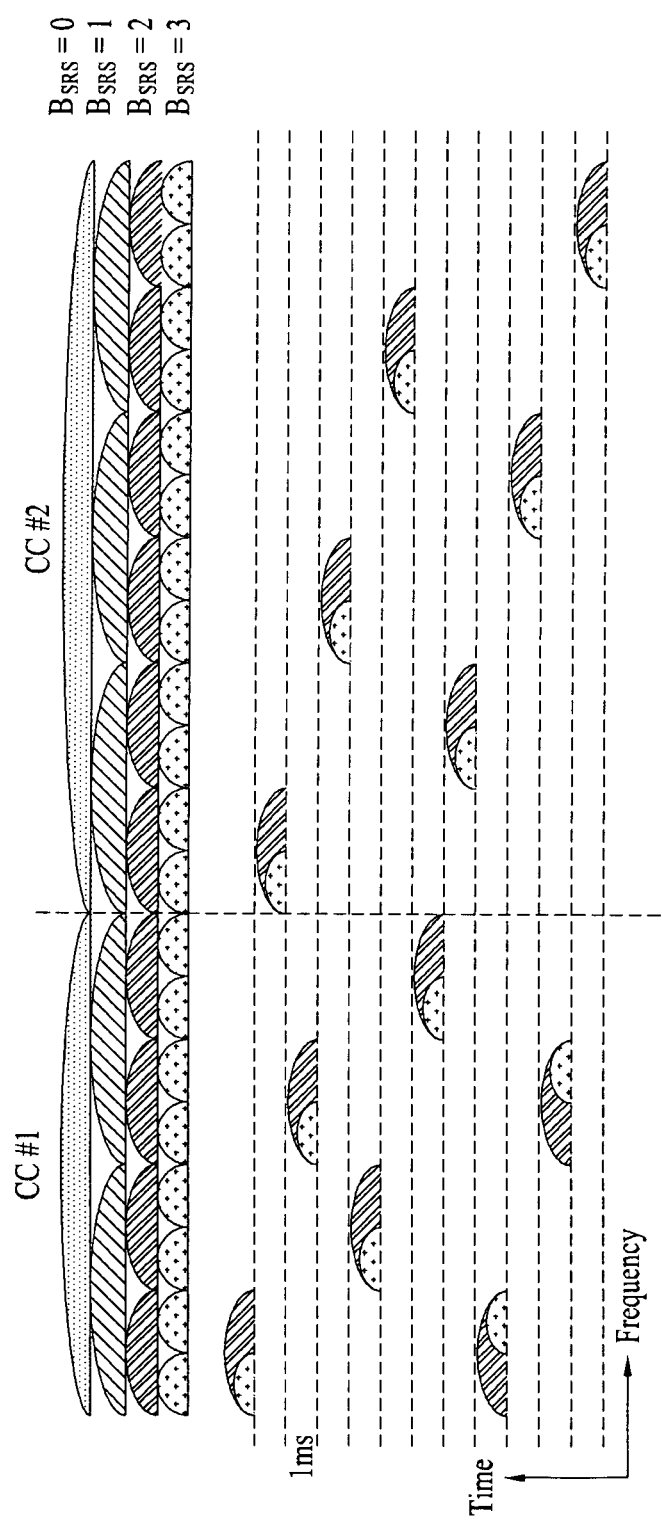
FIG. 9 is a diagram for an example of a method of mapping a sounding reference signal according to a first embodiment of the present invention if a bandwidth of each component carrier is not uniform.

FIG. 9 is a diagram for an example of a method of mapping a sounding reference signal according to a first embodiment of the present invention if a bandwidth of each component carrier is not uniform.

First of all, if a bandwidth of each component carrier is not uniform, according to a first embodiment of the present invention, a base station allocates a parameter combination ($C_{SRS}$, $B_{SRS}$) to one component carrier to set a sounding reference signal bandwidth and allocates ($N_c$−1) $C_{SRS}$ to the rest of ($N_c$−1) component carriers, respectively. Since a bandwidth of a sounding reference signal is identical for all $N_c$ component carriers, $B_{SRS}$ can be automatically determined with $C_{SRS}$ only for the rest of ($N_c$−1) component carriers by allocating ($C_{SRS}$, $B_{SRS}$) to one component carrier. Moreover, the base station sets one sounding reference signal periodicity $T_{SRS}$ and allocates $N_c$ subframe offsets to $N_c$ component carriers, respectively.

Referring to FIG. 9, if a base station allocates ($C_{SRS}$=4, $B_{SRS}$=2) as a parameter combination to a first component carrier to set a sounding reference signal bandwidth, a bandwidth $m_{SRS,2}$ of the sounding reference signal bandwidth carried on the first component carrier has a value of 8. In this case, since a bandwidth of a sounding reference signal bandwidth carried on a second component carrier is equal to that of the sounding reference signal bandwidth carried on the first component carrier, if $C_{SRS}$=1 is allocated to the second component carrier, $B_{SRS}$ corresponding to the second component carrier is automatically set to 2. Moreover, the base station signals $T_{SRS}$=2 ms as a periodicity of a sounding reference signal applied in common to each component carrier. The base station signals $T_{offset}$=0 ms as a subframe offset for the first component carrier. And, the base station signals $T_{offset}$=1 ms as a subframe offset for the second component carrier.

Hence, the user equipment transmits a sounding reference signal of 2 ms periodicity to the base station using the first component carrier and sets a bandwidth $m_{SRS,2}$ of the sounding reference signal to have a value of 8 corresponding to ($C_{SRS}$=4, $B_{SRS}$=2) in Table 2. In this case, the sounding reference signal performs frequency hopping within the first component carrier according to Equations 5 to 7 using $N_2$=2. Therefore, information on a channel status across a whole band of the first component carrier is provided to the base station.

Likewise, the user equipment transmits a sounding reference signal of 2 ms periodicity using the second component carrier and sets a bandwidth $m_{SRS,2}$ of the sounding reference signal to have a value of 8 corresponding to ($C_{SRS}$=1, $B_{SRS}$=2) in Table 2. In Table 2, in case of ($C_{SRS}$=1, $B_{SRS}$=2), $N_2$ is 2 as well. Using this fact, the sounding reference signal performs frequency hopping within the second component carrier according to Equations 5 to 7. Yet, the second component carrier, which uses the second component carrier, starts from a subframe delayed by 1 ms allocated as a subframe offset value.

Second Embodiment

According to a second embodiment, although every component carrier has the same bandwidth of a sounding reference signal, a periodicity and subframe offset of the sounding reference signal are independently set for each component carrier.

Figure 10:
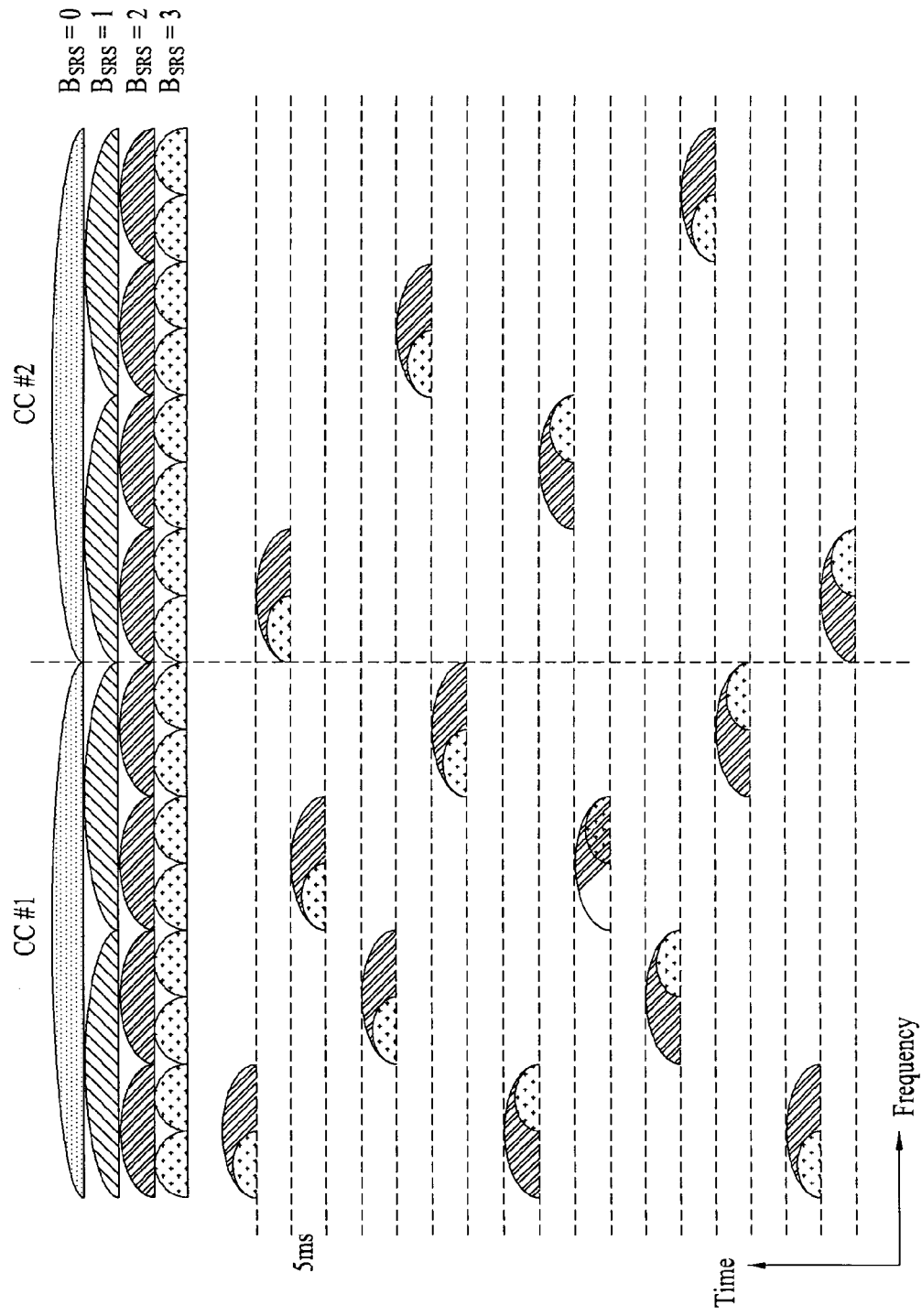
FIG. 10 is a diagram for an example of a method of mapping a sounding reference signal according to a second embodiment of the present invention if a bandwidth of each component carrier is uniform.

FIG. 10 is a diagram for an example of a method of mapping a sounding reference signal according to a second embodiment of the present invention if a bandwidth of each component carrier is uniform.

According to a second embodiment of the present invention, a base station allocates one parameter combination ($C_{SRS}$, $B_{SRS}$) for setting a bandwidth of a sounding reference signal to a user equipment and allocates $N_c$ sounding reference signal periodicities $T_{SRS}$ and $N_c$ subframe offsets to $N_c$ component carriers, respectively. In this case, although bandwidths of all $N_c$ component carriers are identical to each other, since the periodicities of the sounding reference signals corresponding to the component carriers are independently set, respectively, time-frequency density of the sounding reference signals may not be uniform across a whole uplink band.

Referring to FIG. 10, a base station signals ($C_{SRS}$=4, $B_{SRS}$=2) as a sounding reference signal bandwidth parameter combination applied in common to each component carrier to a user equipment. The base station signals $T_{SRS}$=10 ms and $T_{offset}$=0 ms for a first component carrier, and $T_{SRS}$=20 ms and $T_{offset}$=5 ms for a second component carrier.

Hence, the user equipment transmits a sounding reference signal of 10 ms periodicity to the base station using the first component carrier and sets a bandwidth $m_{SRS,2}$ of the sounding reference signal to a value of 8 corresponding to ($C_{SRS}$=4, $B_{SRS}$=2) in Table 2. In this case, the sounding reference signal performs frequency hopping within the first component carrier by Equations 5 to 7 using $N_2$=2. Therefore, the sounding reference signal provides information on a channel status to the base station across a whole band of the first component carrier.

Likewise, the user equipment transmits a sounding reference signal of 20 ms periodicity to the base station using the second component carrier and sets a bandwidth $m_{SRS,2}$ of the sounding reference signal to a value of 8 corresponding to ($C_{SRS}$=4, $B_{SRS}$=2) in Table 2 . In this case, the sounding reference signal performs frequency hopping within the first component carrier by Equations 5 to 7 using $N_2$=2 . Yet, the sounding reference signal, which uses the second component carrier, starts from a subframe delayed by 5 ms allocated to an offset value.

Figure 11:
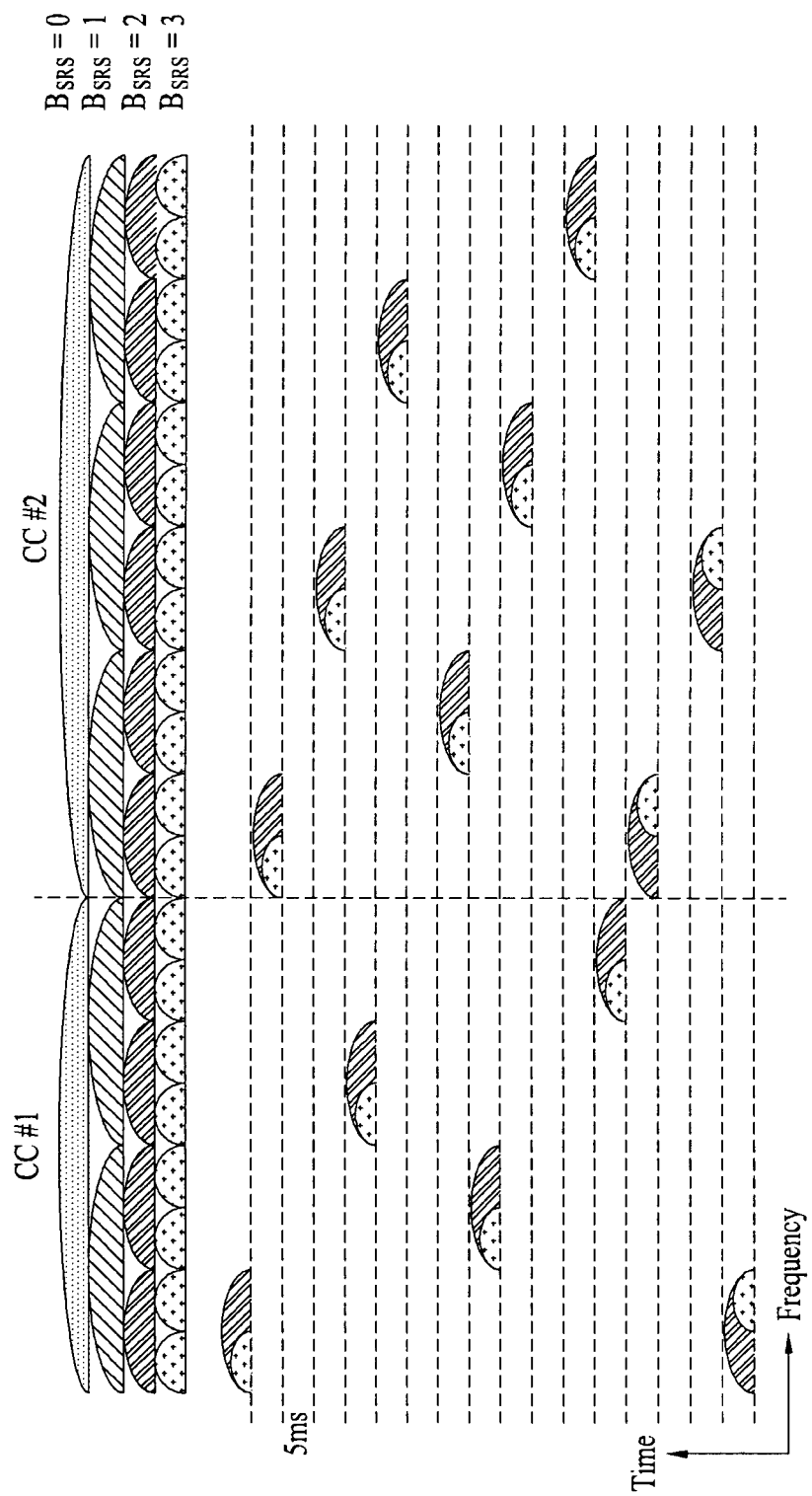
FIG. 11 is a diagram for an example of a method of mapping a sounding reference signal according to a second embodiment of the present invention if a bandwidth of each component carrier is not uniform.

FIG. 11 is a diagram for an example of a method of mapping a sounding reference signal according to a second embodiment of the present invention if a bandwidth of each component carrier is not uniform.

First of all, if a bandwidth of each component carrier is not uniform, according to a second embodiment of the present invention, a base station allocates a parameter combination ($C_{SRS}$, $B_{SRS}$) to one component carrier and allocates ($N_c$–1) $C_{SRS}$ to the rest of ($N_c$–1) component carriers, respectively. As mentioned in the foregoing description of FIG. 12, since a bandwidth of a sounding reference signal is identical for all $N_c$ component carriers, $B_{SRS}$ can be automatically determined with $C_{SRS}$ only for the rest of ($N_c$–1) component carriers by allocating ($C_{SRS}$, $B_{SRS}$) to one component carrier. Moreover, the base station allocates $N_c$ sounding reference signal periodicities $T_{SRS}$ and $N_c$ subframe offsets to $N_c$ component carriers, respectively.

Referring to FIG. 11, if a base station allocates ($C_{SRS}$=4, $B_{SRS}$=2) as a sounding reference signal bandwidth parameter combination to a first component carrier, a bandwidth $m_{SRS,2}$ of the sounding reference signal bandwidth carried on the first component carrier has a value of 8. According to the second embodiment of the present invention, since a bandwidth of a sounding reference signal bandwidth carried on a second component carrier is equal to that of the sounding reference signal bandwidth carried on the first component carrier as well, if $C_{SRS}$=1 is allocated to the second component carrier, $B_{SRS}$ corresponding to the second component carrier is automatically set to 2. Moreover, the base station signals $T_{SRS}$=20 ms and $T_{offset}$=0 ms for the first component carrier, and $T_{SRS}$=10 ms and $T_{offset}$=5 ms for the second component carrier.

Hence, the user equipment transmits a sounding reference signal of 20 ms periodicity to the base station using the first component carrier and sets a bandwidth $m_{SRS,2}$ of the sounding reference signal to have a value of 8 corresponding to ($C_{SRS}$=4, $B_{SRS}$=2) in Table 2 . In this case, the sounding reference signal performs frequency hopping within the first component carrier according to Equations 5 to 7 using $N_2$=2 . Therefore, information on a channel status across a whole band of the first component carrier is provided to the base station.

Likewise, the user equipment transmits a sounding reference signal of 10 ms periodicity using the second component carrier and sets a bandwidth $m_{SRS,2}$ of the sounding reference signal to have a value of 8 corresponding to ($C_{SRS}$=1, $B_{SRS}$=2) in Table 2 . In Table 2, in case of ($C_{SRS}$=1, $B_{SRS}$=2), $N_2$ is 2 as well. Using this fact, the sounding reference signal performs frequency hopping within the second component carrier according to Equations 5 to 7 . Yet, the second component carrier, which uses the second component carrier, starts from a subframe delayed by 5 ms allocated as a subframe offset value.

Meanwhile, according to a second embodiment of the present invention, if no limitation is put on a transmission power of a user equipment, a subframe offset value per component carrier and a periodicity of a sounding reference signal can be set without special restriction. On the contrary, if prescribed limitation is put on a transmission power of a user equipment, it is unable to maintain a single carrier property in uplink. This is because of the following reason. Even if a subframe offset value is set different per component carrier, since a periodicity of a sounding reference signal is independent, it is able to transmit a plurality of sounding reference signals using a plurality of component carriers in the same subframe.

To solve this problem, the present embodiment proposes a first scheme as follows. First of all, a sounding reference signal having a longest periodicity is transmitted only but transmissions of the rest of sounding reference signals are skipped.

Alternatively, the present embodiment proposes a second scheme as follows. First of all, a sounding reference signal having a longest periodicity is transmitted and the rest of sounding reference signals are transmitted by being delayed. Specifically, according to the second scheme, a parameter $T_{delay}$ is preferably signaled to indicate how many subframes are used to delay a sounding reference signal for each component carrier.

Figure 12:
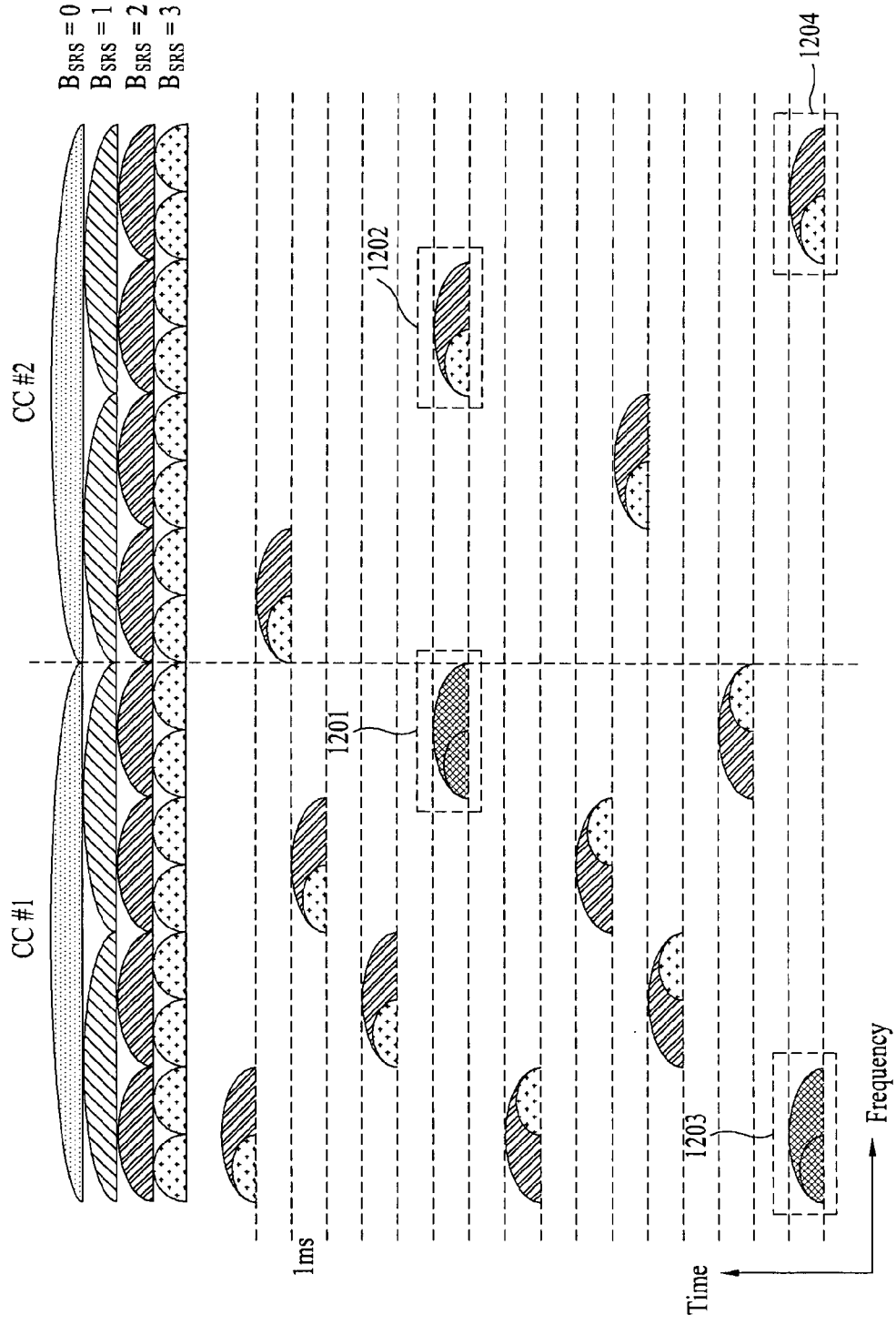
FIG. 12 is a diagram for an example of a first scheme for meeting a single carrier property in a second embodiment of the present invention.

FIG. 12 is a diagram for an example of a first scheme for meeting a single carrier property in a second embodiment of the present invention.

Referring to FIG. 12, since a sounding reference signal 1201/1203 carried on a first component carrier is transmitted in the same subframe of a sounding reference signal 1202/1204 carried on a second component carrier, it is unable to meet a single carrier property. In this case, according to the first scheme, the sounding reference signals 1202 and 1204 carried on the second component carrier having a longer periodicity are transmitted and the transmission of the sounding reference signals 1201 and 1203 carried on the first component carrier is skipped.

Figure 13:
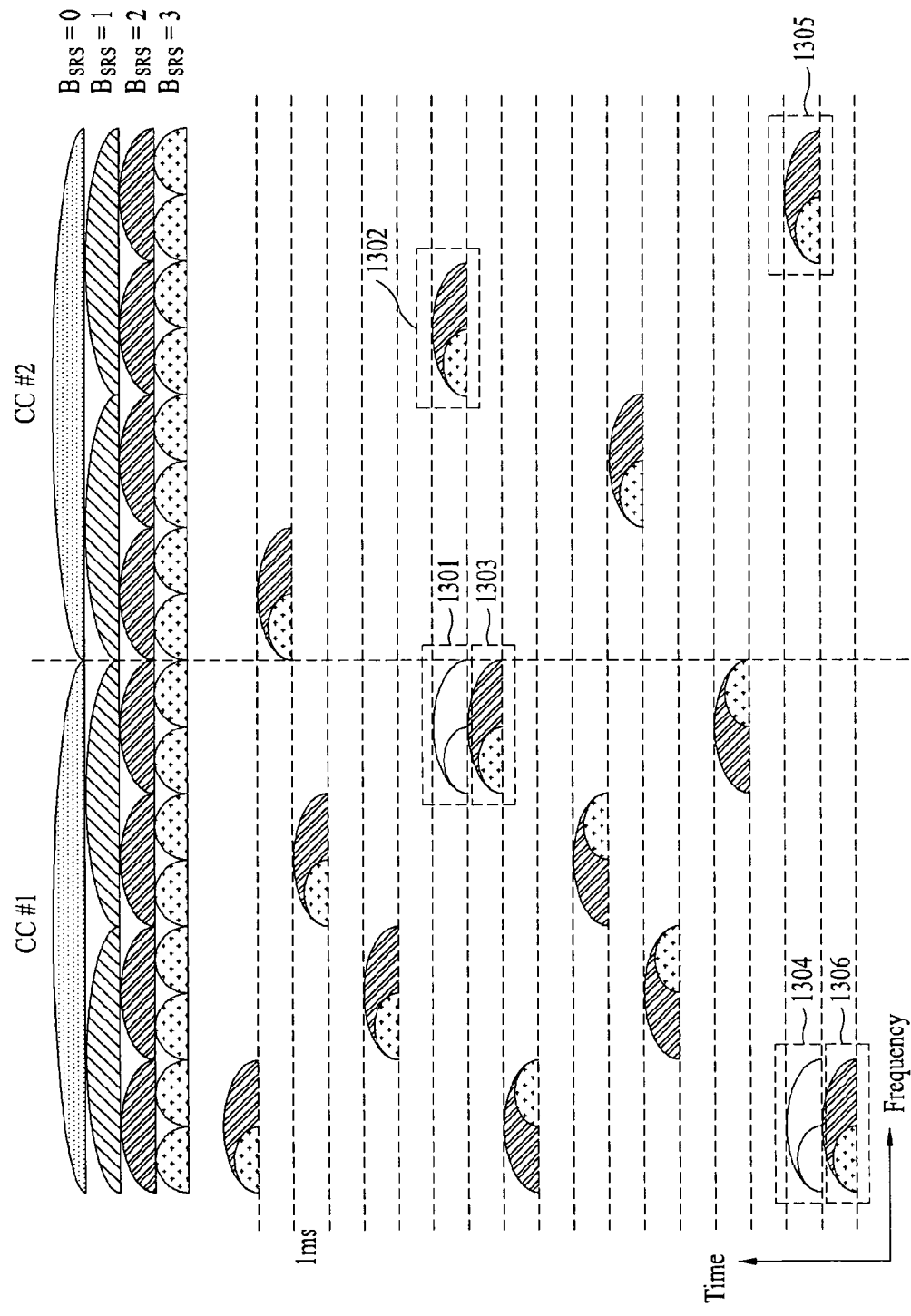
FIG. 13 is a diagram for an example of a second scheme for meeting a single carrier property in a second embodiment of the present invention.

FIG. 13 is a diagram for an example of a second scheme for meeting a single carrier property in a second embodiment of the present invention.

Referring to FIG. 13, a sounding reference signal 1301/1304 carried on a second component carrier is transmitted in the same subframe of a sounding reference signal 1302/1305 carried on a second component carrier. In this case, according to the second scheme, the sounding reference signals 1302 and 1305 carried on the second component carrier having a longer periodicity are transmitted in a subframe originally set for the transmission and the sounding reference signals 1301 and 1304 carried on the first component carrier are transmitted by being delayed. In the example shown in the drawing, assuming that a base station signals a parameter $T_{delay}$ by 1 ms, a sounding reference signal indicated by such a reference number as 1303 and 1306 is transmitted in a 1 ms-dealyed subframe.

Meanwhile, FIG. 12 and FIG. 12 show the case that a bandwidth of each component carrier is constant. If bandwidths of component carriers are different, the following schemes can be further taken into consideration.

The present embodiment proposes a third scheme applied to a case that bandwidths of component carriers are different. According to the third scheme, a sounding reference signal corresponding to a component carrier having a widest bandwidth is transmitted only but transmission of the rest of sounding reference signals is skipped.

And, the present embodiment proposes a fourth scheme as follows. According to the fourth scheme, a sounding reference signal corresponding to a component carrier having a widest bandwidth is transmitted only and the rest of sounding reference signals are transmitted by being delayed. In particular, according to the fourth scheme, a parameter $T_{delay}$ indicating how many subframes per component carrier are used to delay a sounding reference signal is preferably signaled.

Figure 14:
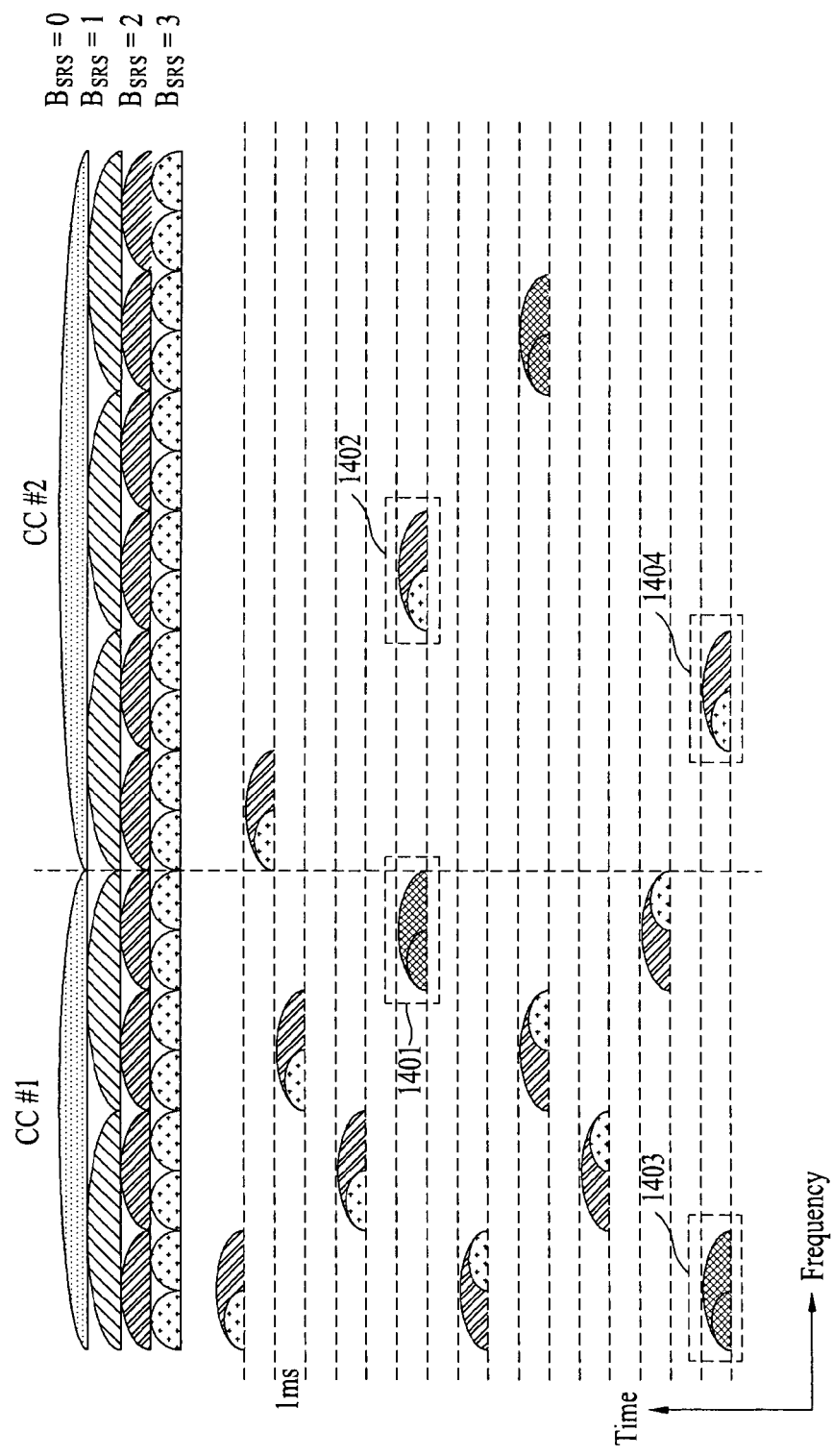
FIG. 14 is a diagram for an example of a third scheme for meeting a single carrier property in a second embodiment of the present invention.

FIG. 14 is a diagram for an example of a third scheme for meeting a single carrier property in a second embodiment of the present invention.

Referring to FIG. 14, since a sounding reference signal 1401/1403 carried on a first component carrier is transmitted in the same subframe of a sounding reference signal 1402/1404 carried on a second component carrier, the sounding reference signals 1402 and 1404 carried on the second component carrier having a wider bandwidth are transmitted but transmission of the sounding reference signals 1401 and 1403 is skipped.

Figure 15:
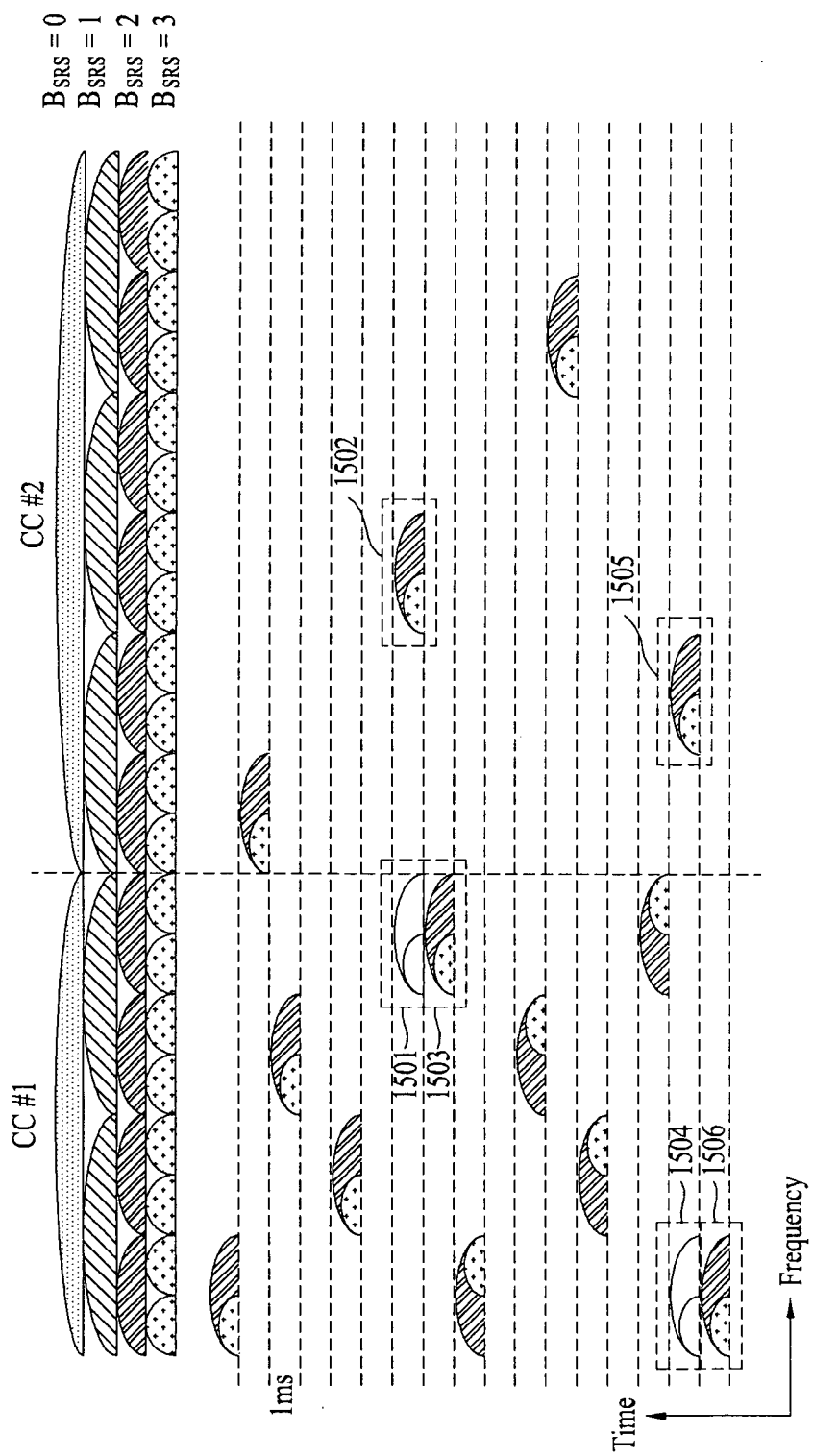
FIG. 15 is a diagram for an example of a fourth scheme for meeting a single carrier property in a second embodiment of the present invention.

FIG. 15 is a diagram for an example of a fourth scheme for meeting a single carrier property in a second embodiment of the present invention.

Referring to FIG. 15, according to a fourth scheme, a sounding reference signal 1502/1505 carried on a second component carrier having a wider bandwidth is transmitted in a subframe originally set for transmission but sounding reference signals 1501 and 1504 carried on a first component carrier are transmitted by being delayed into a sounding reference signal indicated by a reference number 1503/1506. In the example shown in FIG. 15, assume that a base station signals a parameter $T_{delay}$ by 1 ms, Third Embodiment According to a third embodiment, every component carrier has the same periodicity and a bandwidth and subframe offset of a sounding reference signal are independently set for each component carrier.

As mentioned in the foregoing description, if no limitation is put on a transmission power of a user equipment, the same offset value can be reasonably set for each component carrier. Yet, if limitation is put on a transmission power of a user equipment, different offset values are preferably set for the component carriers, respectively to meet the single carrier property in uplink.

Figure 16:
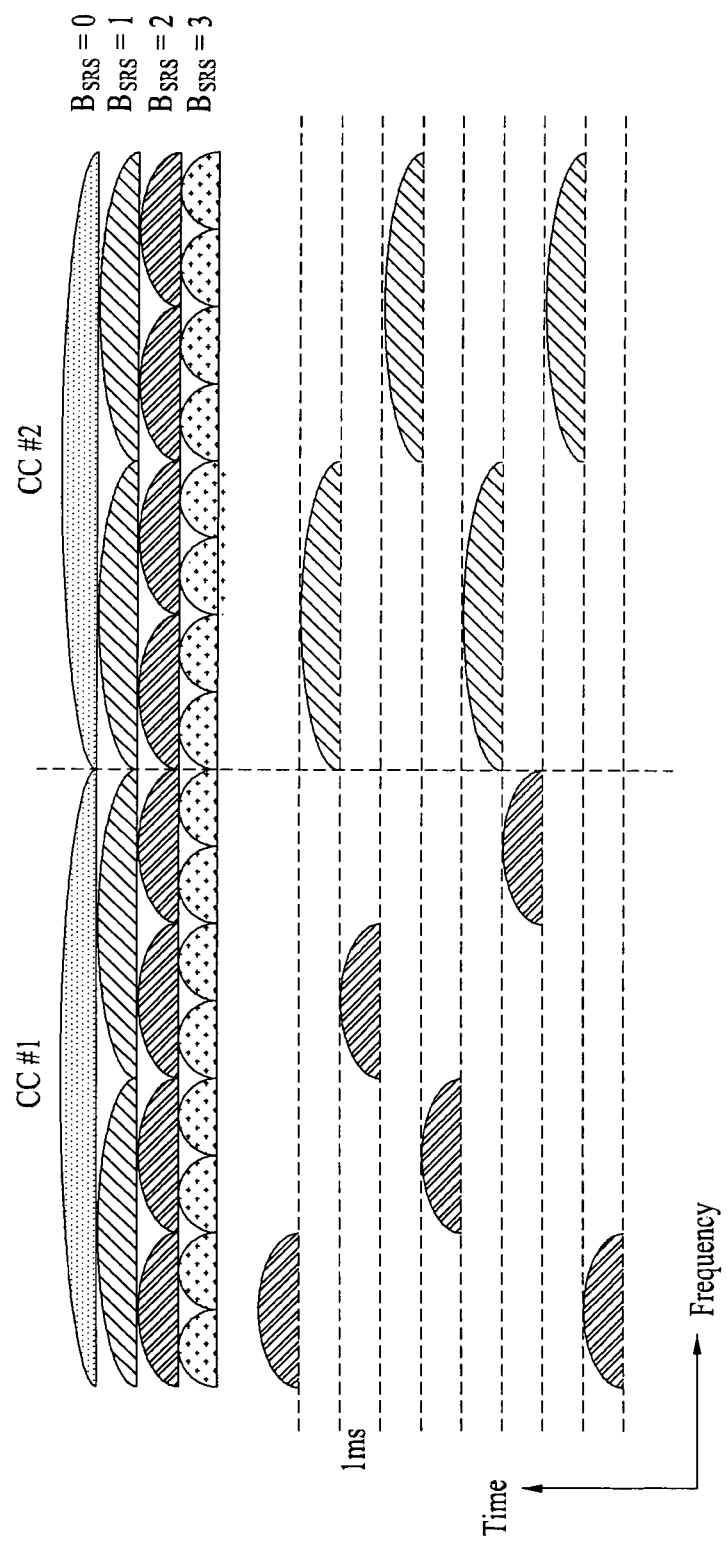
FIG. 16 is a diagram for an example of a method of mapping a sounding reference signal according to a third embodiment of the present invention if a bandwidth of each component carrier is uniform.

FIG. 16 is a diagram for an example of a method of mapping a sounding reference signal according to a third embodiment of the present invention if a bandwidth of each component carrier is identical.

First of all, while bandwidths of component carriers are identical to each other, as bandwidths of sounding reference signals corresponding to the component carriers are independent from each other, a base station signals one common $C_{SRS}$ as a parameter for setting a bandwidth of a sounding reference signal and $B_{SRS}$ respectively for the $N_c$ component carriers to a user equipment. The base station sets one sounding reference signal periodicity $T_{SRS}$ and allocates $N_c$ subframe offsets to $N_c$ component carriers, respectively. In this case, although the bandwidths of all $N_c$ component carriers are identical to each other, since the bandwidth of the sounding reference signal corresponding to each of the component carriers is set independent, time-frequency density of the sounding reference signals may not be uniform across a while uplink band.

Referring to FIG. 16, a base station sets one $C_{SRS}$ to 4 as a parameter for setting a bandwidth of a sounding reference signal and signals $B_{SRS}=2$ for a first component carrier and $B_{SRS}=1$ for a second component carrier to a user equipment. The bas station signals $T_{SRS}=2$ ms as a periodicity of one sounding reference signal. And, the base station signals $T_{offset}=0$ ms as a subframe offset for the first component carrier and $T_{offset}=1$ ms as a subframe offset for the second component carrier.

Hence, the user equipment transmits a sounding reference signal of 20 ms periodicity to the base station using the first component carrier and sets a bandwidth $m_{SRS,2}$ of the sounding reference signal to have a value of 8 corresponding to ($C_{SRS}=4$, $B_{SRS}=2$) in Table 2 . In this case, the sounding reference signal performs frequency hopping within the first component carrier according to Equations 5 to 7 using $N_2=2$.

Meanwhile, the user equipment transmits a sounding reference signal of 20 ms periodicity to the base station using the second component carrier but sets a bandwidth $m_{SRS,1}$ of the sounding reference signal to have a value of 16 corresponding to ($C_{SRS}=4$, $B_{SRS}=1$) in Table 2 . In this case, the sounding reference signal performs frequency hopping within the second component carrier according to Equations 5 to 7 . Yet, the sounding reference signal, which uses the second component carrier, starts from a subframe delayed by 1 ms allocated to a subframe offset value unlike the first component carrier.

Figure 17:
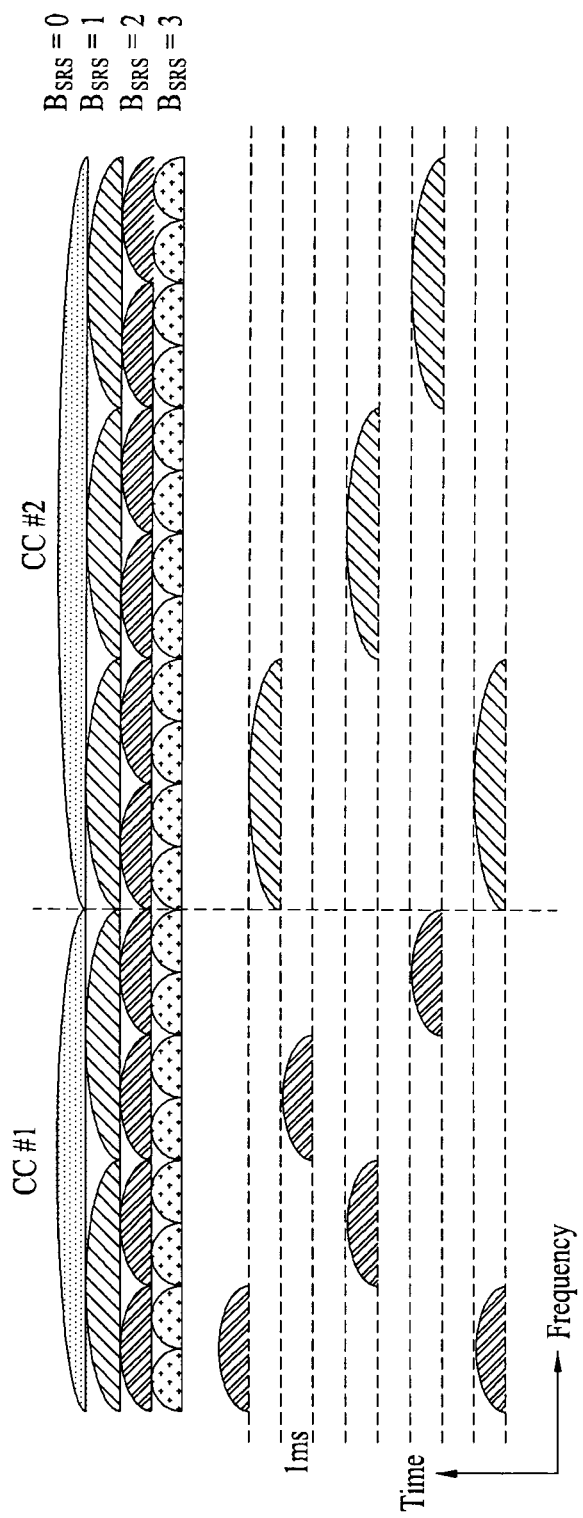
FIG. 17 is a diagram for an example of a method of mapping a sounding reference signal according to a third embodiment of the present invention if a bandwidth of each component carrier is not uniform.

FIG. 17 is a diagram for an example of a method of mapping a sounding reference signal according to a third embodiment of the present invention if a bandwidth of each component carrier is not uniform.

First of all, when bandwidths of component carriers are not uniform, since bandwidths of sounding reference signals corresponding to the component carriers are independent from each other, a base station signals parameter combinations ($C_{SRS}$, $B_{SRS}$) for $N_c$ component carriers as parameters for setting bandwidths of sounding reference signals to a user equipment, respectively. The base station sets one sounding reference signal periodicity $T_{SRS}$ and allocates $N_c$ subframe offsets to the $N_c$ component carriers.

Referring to FIG. 17, a base station signals ($C_{SRS}=4$, $B_{SRS}=2$) as a parameter combination for setting a bandwidth of a sounding reference signal for a first component carrier and ($C_{SRS}=1$, $B_{SRS}=1$) as a parameter combination for setting a bandwidth of a sounding reference signal for a second component carrier to a user equipment. The bas station signals $T_{SRS}=2$ ms as a periodicity of one sounding reference signal. And, the base station signals 0 ms as a subframe offset for the first component carrier and 1 ms as a subframe offset for the second component carrier.

Hence, the user equipment transmits a sounding reference signal of 2 ms periodicity to the base station using the first component carrier and sets a bandwidth $m_{SRS,2}$ of the sounding reference signal to have a value of 8 corresponding to ($C_{SRS}=4$, $B_{SRS}=2$) in Table 2.

Likewise, the user equipment transmits a sounding reference signal of 2 ms periodicity to the base station using the second component carrier and sets a bandwidth $m_{SRS,2}$ of the sounding reference signal to have a value of 16 corresponding to ($C_{SRS}=1$, $B_{SRS}=1$) in Table 2 . Yet, the sounding reference signal, which uses the second component carrier, starts from a subframe delayed by 1 ms allocated to a subframe offset value unlike the first component carrier.

Fourth Embodiment

The first to third embodiments propose the methods of signaling parameters in common to or independent from the respective component carriers to efficiently transmit sounding reference signals. In transmitting sounding reference signals, a fourth embodiment of the present invention gathers a plurality of component carriers together and then considers the gathered component carriers as one wideband carrier.

To implement this, three kinds of schemes for extending Tables 1 to 4 are proposed as follows.

1) According to a first scheme, a sounding reference signal parameter set for one bandwidth resulting from gathering bandwidths of component carriers together is additionally set. In this case, a maximum bandwidth of a sounding reference signal is equal to a carrier-integrated whole uplink bandwidth.

Figure 18:
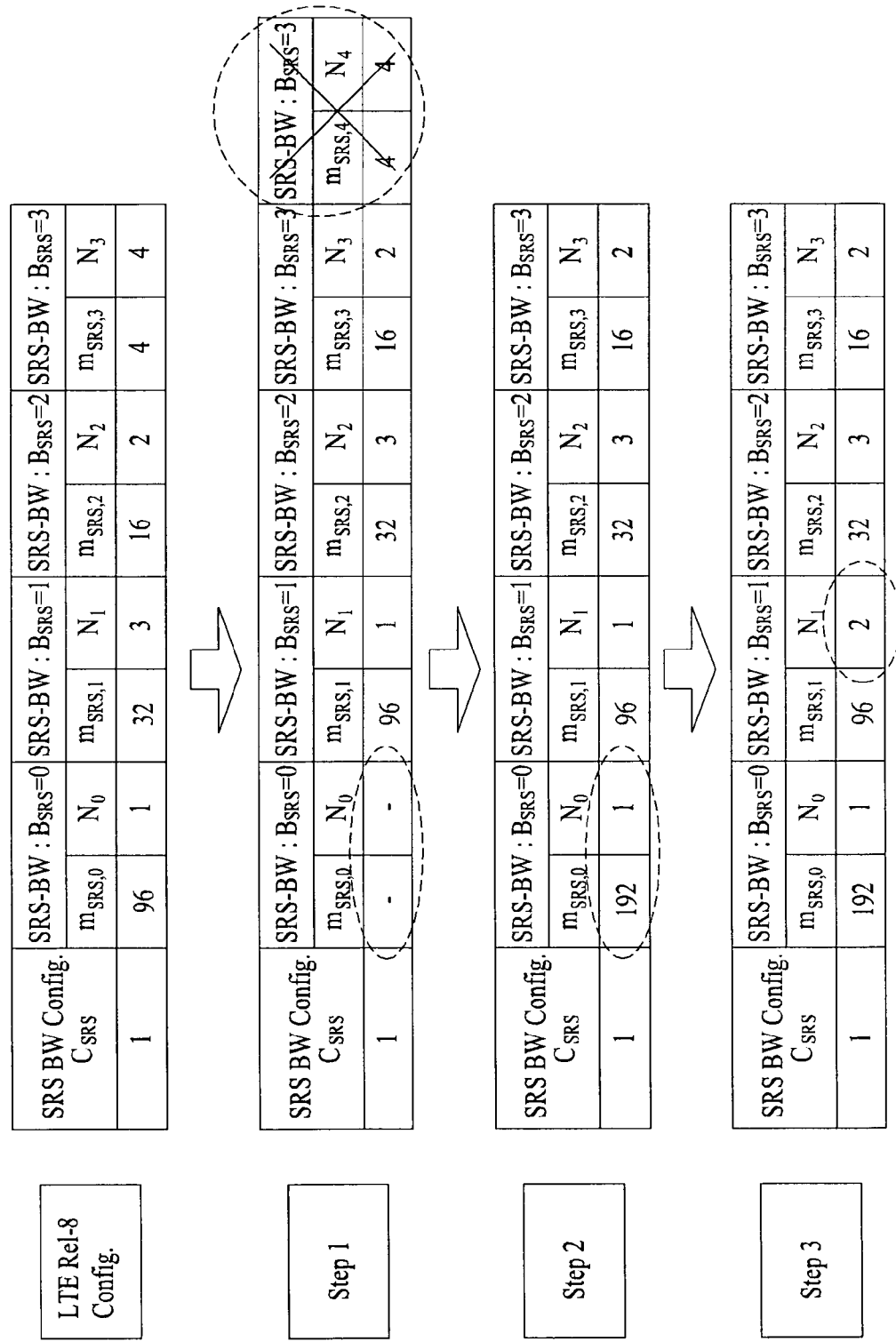
FIG. 18 is a diagram for explaining a method of allocating a resource for a sounding reference signal according to a fourth embodiment of the present invention.

FIG. 18 is a diagram for explaining a method of allocating a resource for a sounding reference signal according to a fourth embodiment of the present invention. Specifically, for clarity and convenience in describing FIG. 18, assume a case that $C_{SRS}$ in Table 4 is 1 and a case that the number $N_c$ of component carriers is 2. And, assume that one component carrier is constructed with $W_c$ resource blocks (RBs).

Referring to FIG. 18, in Step 1, $B_{SRS}$ among parameters for determining a bandwidth of a previous sounding reference signal is incremented by one step. In particular, it is set to $B_{SRS} \leftarrow B_{SRS}+1$ and a column having $B_{SRS}=4$ is deleted. Hence, a first column having $B_{SRS}$ set to 0 is empty.

In Step 2, a parameter for a maximum bandwidth of a sounding reference signal is added to a first column having $B_{SRS}$ set to 0. In particular, $m_{SRS,0}$ is set to $m_{SRS,1} \cdot N_c = W_c \cdot N_c$ to cope with a sounding reference signal bandwidth size and a parameter $N_0$ related to frequency hopping of a sounding reference signal is set to 1. Hence, in FIG. 21, $m_{SRS,0}$ is set to $96 \cdot 2 = 192$.

And, $m_{SRS,b}$ and $N_b$ should meet such a condition as $m_{SRS,b} = m_{SRS,b+1} \cdot N_{b+1}$. Hence, in Step 3, $N_1$, which is a frequency related parameter in case that $B_{SRS}$ is 1, is modified to meet $m_{SRS,0} = m_{SRS,1} \cdot N_c = m_{SRS,1} \cdot N_1$. Therefore, $N_1$ is set to 2 to meet $192 = 96 \cdot N_1$ in FIG. 21.

According to the above scheme, based on the parameter reset by the above-described scheme, the base station is able to allocate a sounding reference signal having frequency integration applied thereto to an uplink channel by transmitting a parameter set constructed with ($C_{SRS}$, $B_{SRS}$, $b_{hop}$) irrespective of the number $N_c$ of the component carriers.

2) According to a second scheme, all $m_{SRS,b}$ is extended by $N_c$ times to enable a maximum bandwidth of a sounding reference signal to be equal to a whole uplink band. In particular, for all user equipment specific parameters $B_{SRS}$, it is set to $m_{SRS,b} \leftarrow m_{SRS,b} \cdot N_c$.

Figure 19:
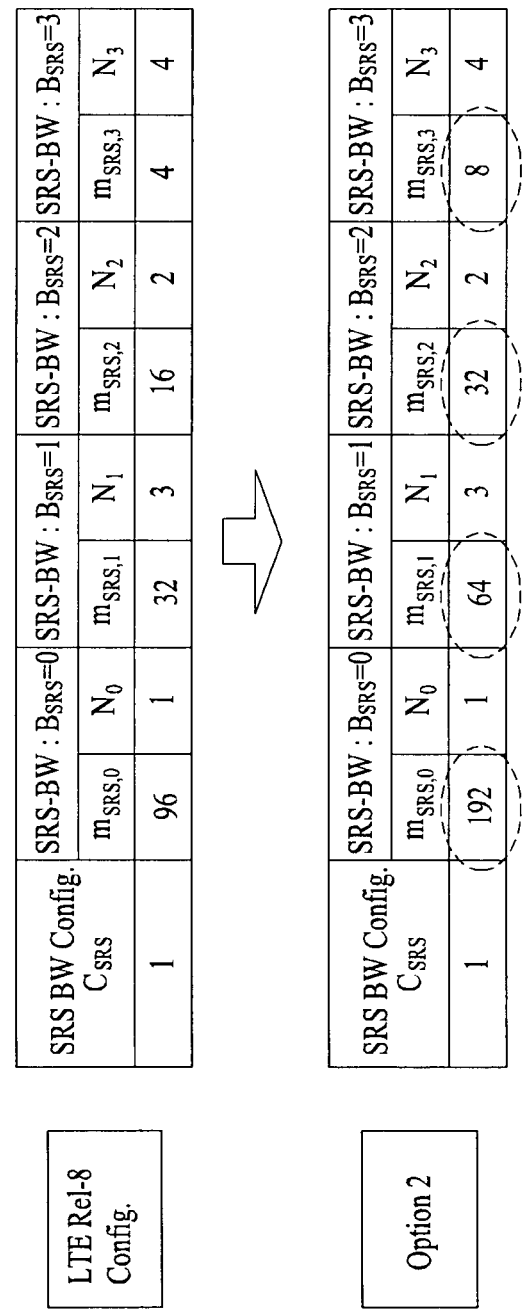
FIG. 19 is a diagram for explaining another method of allocating a resource for a sounding reference signal according to a fourth embodiment of the present invention.

FIG. 19 is a diagram for explaining another method of allocating a resource for a sounding reference signal according to a fourth embodiment of the present invention.

Specifically, FIG. 19 just shows a case that $C_{SRS}$ in Table 4 is 1 and a case that the number $N_c$ of component carriers is 2. And, assume that one component carrier is constructed with $W_c$ resource blocks (RBs). In particular, in FIG. 19, $m_{SRS,0}$ is set to $96 \cdot 2 = 192$ and $m_{SRS,3}$ is set to $4 \cdot 2 = 8$.

According to the second scheme, based on the reset parameter, the base station is able to allocate a sounding reference signal by transmitting a parameter set constructed with ($C_{SRS}$, $B_{SRS}$, $b_{hop}$) irrespective of the number $N_c$ of the component carriers.

3) According to a last scheme, a maximum bandwidth of a sounding reference signal is set to '$m_{SRS,0} = W_c \cdot N_c (b'>0)$' or $m_{SRS,0} = W_c (b'=0)$ and a minimum bandwidth is set to $m_{SRS,3} = 4$. In the last scheme, a base station further transmits one b' as well as the above mentioned parameter set. In this case, b' takes a value ranging from 0 to 3 and includes 2-bit information.

In particular, using a value of b' signaled from a base station, $N_b$ is extended by $N_c$ times. Namely, it is set to $N_b \leftarrow N_b \cdot N_c$.

Subsequently, for parameter sets having $B_{SRS}$ smaller than b', $m_{SRS,b}$ is extended by $N_c$ times.

The above described last scheme is explained with reference to FIGS. 20 to 23 as follows. FIGS. 20 to 23 show just shows a case that $C_{SRS}$ in Table 4 is 1 and a case that the number $N_c$ of component carriers is 2.

Figure 20:
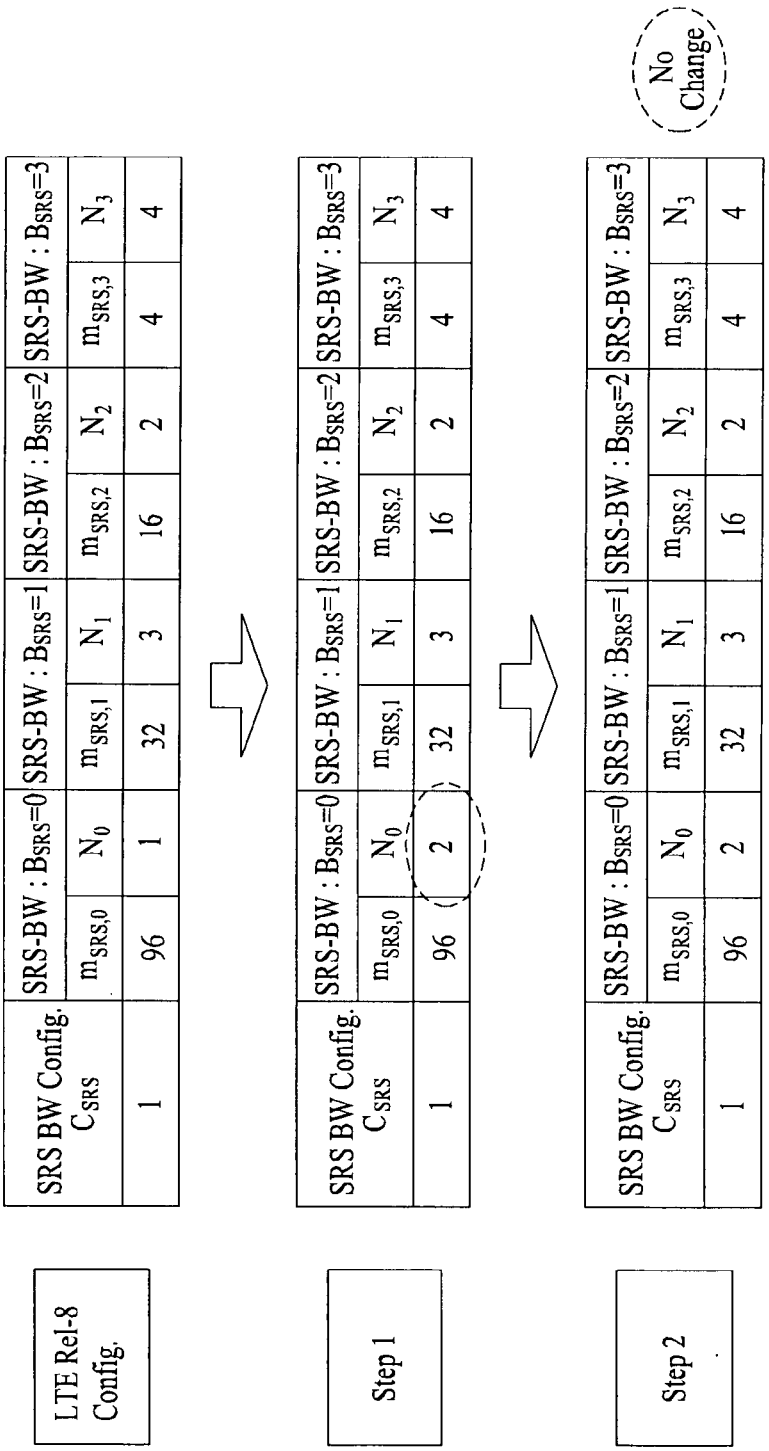
FIGS. 20 to 23 are diagrams for explaining a further method of allocating a resource for a sounding reference signal according to a fourth embodiment of the present invention.

Referring to FIG. 20, b' is signaled as 0 from a base station. Since $N_0$ is extended only by $N_c$ times, the $N_0$ is set to 2. Meanwhile, since parameter sets having $B_{SRS}$ smaller than b' do not exist, a step of extending $m_{SRS,b}$ is skipped.

Figure 21:
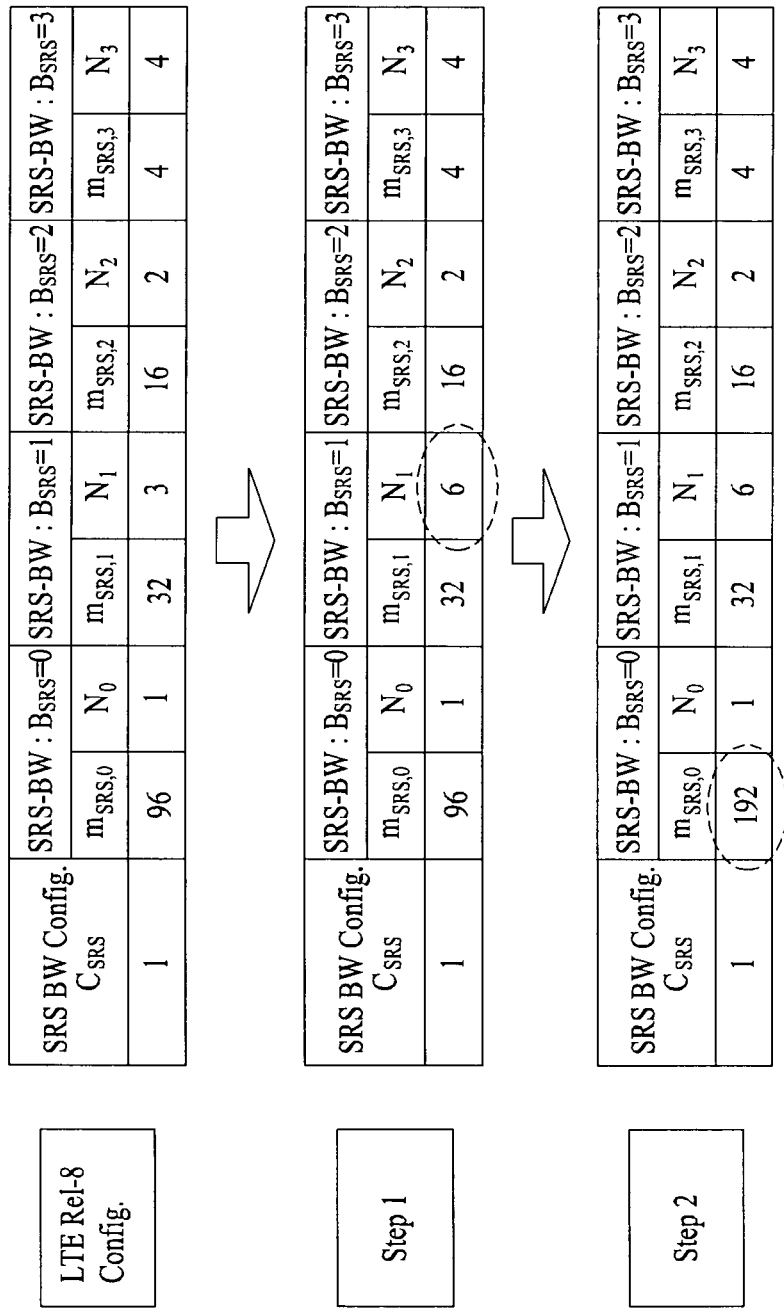
Figure 22:
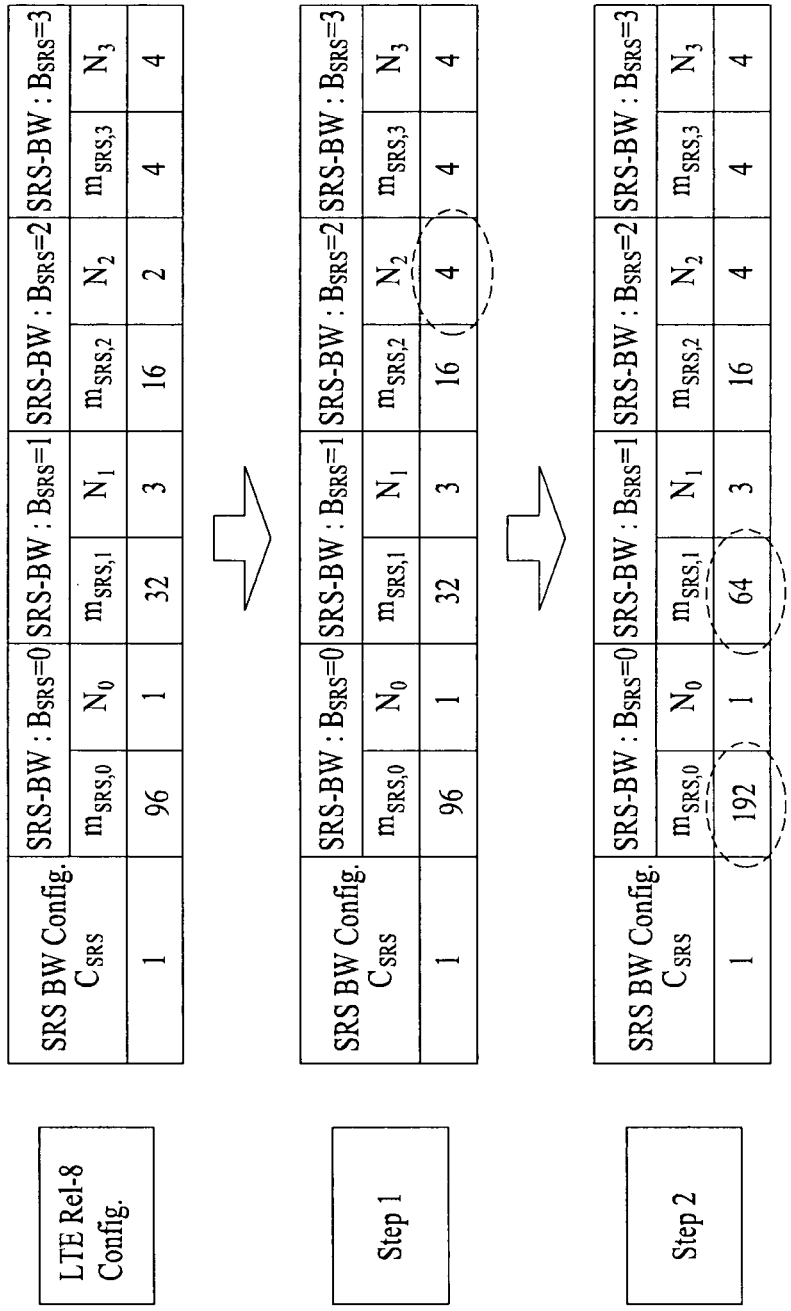
Figure 23:
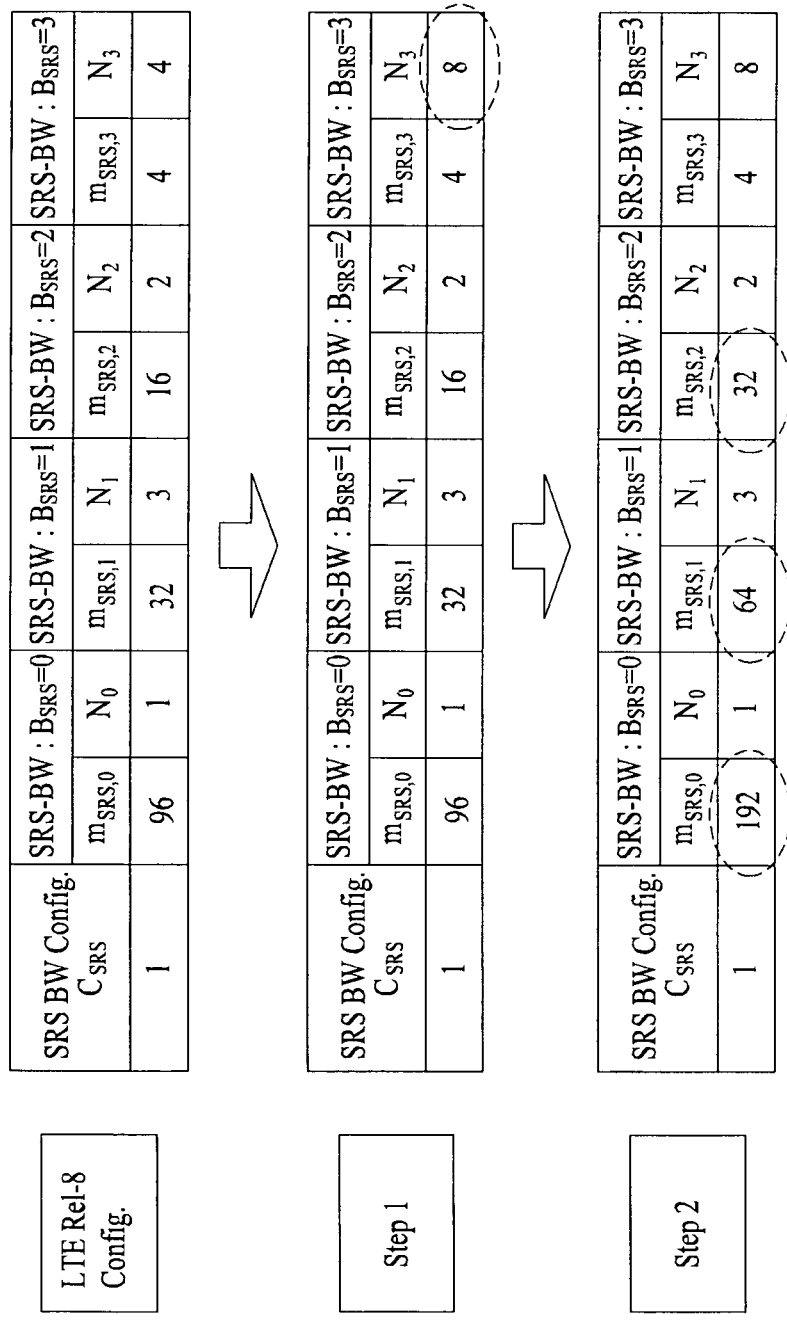

In cases shown in FIGS. 21 to 23, b' is signaled as 1, 2 and 3 from a base station, respectively. $N_b$ is set to 6, 4 or 8. In case of FIG. 21, $m_{SRS,b}$ of a parameter set having $B_{SRS}$ set to 0 is set to meet $m_{SRS,b+1} \cdot N_{b+1}$.

Likewise, in case of FIG. 22, $m_{SRS,b}$ of a parameter set having $B_{SRS}$ set to 0 or 1 is also set to meet $m_{SRS,b+1} \cdot N_{b+1}$. In case of FIG. 23, $m_{SRS,b}$ of a parameter set having $B_{SRS}$ set to 0, 1 or 2 is also set to meet $m_{SRS,b+1} \cdot N_{b+1}$.

As a frequency hopping bandwidth is extended by the above described schemes, it is also necessary to extend a frequency domain parameter $n_{RRC}$ relevant to a frequency hopping start point of a sounding reference signal. IN particular, if the number of RBs of a whole uplink band is $W_u$ that is a multiple of 4, a range of a value of $n_{RRC}$ is extended into $[0, 1, \ldots, W_u/4-1]$ to reflect the whole uplink band.

In a current LTE system, a range of a value of $n_{RRC}$ is $[0, 1, \ldots, 23]$, is able to support a maximum bandwidth 96 RB of a sounding reference signal, and is represented as 5-bit data. Therefore, in order to support a fourth embodiment of the present invention, additional $\log_2[W_u/4-1]-5$ RB for $n_{RRC}$ is requested.

Figure 24:
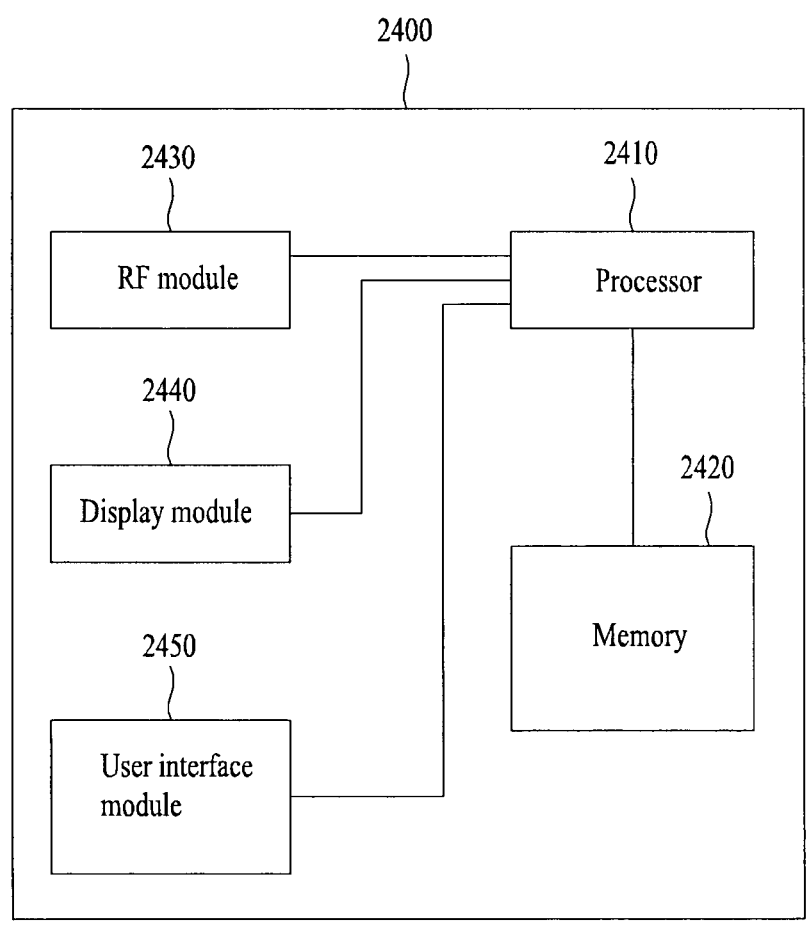
FIG. 24 is a block diagram of a communication transceiver according to one embodiment of the present invention.

FIG. 24 is a block diagram of a communication transceiver according to one embodiment of the present invention, in which a transceiver can include a base station or a user equipment in part.

Referring to FIG. 24, a transceiver 2400 includes a processor 2410, a memory 2420, an RF module 2430, a display module 2440 and a user interface module 2450.

The transceiver 2400 is shown for clarity and convenience of the following description. And, some modules can be omitted from the transceiver 2400 shown in the drawing. Optionally, the transceiver 2400 is able to further include necessary module(s). And, some modules of the transceiver 2400 can be divided into sub-modules. The processor 2420 is configured to perform an operation according to an embodiment of the present invention exemplarily shown with reference to the drawing.

In particular, in case that the transceiver 2400 is a part of a base station, the processor 2420 is able to perform a function of generating a control signal and mapping the generated control signal by a control channel established within a plurality of frequency blocks. In case that the transceiver 2400 is a part of a user equipment, the processor 2420 checks a control channel directed to itself from signals received from a plurality of frequency blocks and is then able to extract a control signal from the checked control channel.

Subsequently, the processor 2420 is able to perform a necessary operation based on the control signal. Detailed operations of the processor 2420 can refer to the contents described with reference to FIGS. 1 to 23.

The memory 2420 is connected to the processor 2410 and stores an operating system, applications, program codes, data and the like. The RF module 2430 is connected to the processor 2410 and performs a function of converting a baseband signal to a radio signal or converting a radio signal to a baseband signal. For this, the RF module 2430 performs analog conversion, amplification, filtering and frequency uplink transform or inverse processes thereof. The display module 2440 is connected to the processor 2410 and displays various kinds of informations, by which the present invention is non-limited. The display module 2440 can include such a well-known element as LCD (Liquid Crystal Display), LED (Light Emitting Diode), OLED (Organic Light Emitting Diode) and the like. The user interface module 2450 is connected to the processor 2410 and can include a combination of well-known interfaces including a keypad, a touchscreen and the like.

The above described embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of 'what is claimed is' or that those claims can be included as new claims by revision after filing an application.

In this disclosure, embodiments of the present invention are described centering on the data transmission/reception relations between a terminal and a base station. In this disclosure, a specific operation explained as performed by a base station can be performed by an upper node of the base station in some cases. In particular, in a network constructed with a plurality of network nodes including a base station, it is apparent that various operations performed for communication with a terminal can be performed by a base station or other networks except the base station. In this case, 'base station' can be replaced by such a terminology as a fixed station, a Node B, an eNode B (eNB), an access point and the like. And, 'terminal' can be replaced by such a terminology as a user equipment (UE), a mobile station (MS), a mobile subscriber station (MSS)' and the like.

Embodiments of the present invention can be implemented using various means. For instance, embodiments of the present invention can be implemented using hardware, firmware, software and/or any combinations thereof. In case of the implementation by hardware, a method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

[Industrial Applicability]

Accordingly, the present invention is applicable to a wireless communication system. More particularly, the present invention is applicable to a method and apparatus for transmitting a sounding reference signal in a frequency-integration applied wireless communication system.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A method of transmitting sounding reference signals, which are transmitted to a base station using a plurality of component carriers at a user equipment in a wireless communication system, the method comprising:
   receiving offset values of a plurality of component carriers from the base station, the offset values corresponding to subframes in which the sounding reference signals are transmitted; and
   transmitting the sounding reference signals to the base station using the plurality of component carriers in the subframes corresponding to the offset values of the plurality of component carriers,
   wherein, if the sounding reference signals are transmitted using at least two component carriers in the same subframe, a specific sounding reference signal having a longest sounding reference signal transmission period is only transmitted using one component carrier corresponding to the specific sounding reference signal among the at least two component carriers,
   wherein a remainder of the sounding reference signals being transmitted that are not the specific sounding reference signal having the longest sounding reference signal transmission period are delayed, and
   wherein sounding reference signal transmission periods for the plurality of component carriers are different from each other.

2. The method of claim 1, wherein the offset values of each component carrier among the plurality of component carriers are different from each other.

3. The method of claim 2, wherein sounding reference signal bandwidths for the plurality of component carriers are different from each other.

4. A user equipment in a wireless communication system, comprising:
   a receiving module for receiving parameters for sounding reference signals from a base station;
   a processor for identifying offset values of a plurality of component carriers, the offset values corresponding to subframes in which the sounding reference signals are transmitted; and
   a transmitting module for transmitting the sounding reference signals to the base station using the plurality of component carriers in subframes corresponding to the offset values of the plurality of component carriers,
   wherein, if the sounding reference signals are transmitted using at least two component carriers in the same subframe, a specific sounding reference signal having a longest sounding reference signal transmission period is only transmitted using one component carrier corresponding to the specific sounding reference signal among the at least two component carriers,
   wherein a remainder of the sounding reference signals being transmitted that are not the specific sounding reference signal having the longest sounding reference signal transmission period are delayed, and
   wherein sounding reference signal transmission periods for the plurality of component carriers are different from each other.

5. The user equipment of claim 4, wherein the offset values of each component carrier among the plurality of component carriers are different from each other.

6. The user equipment of claim 5, wherein sounding reference signal bandwidths for the plurality of component carriers are different from each other.

* * * * *